United States Patent
Kubo et al.

(10) Patent No.: US 7,781,104 B2
(45) Date of Patent: Aug. 24, 2010

(54) SEPARATOR PAPER FOR ALKALINE BATTERY AND THE ALKALINE BATTERY

(75) Inventors: Yoshiyo Kubo, Kochi-ken (JP); Yoshitada Hayashi, Kochi-ken (JP); Masahiko Ueta, Kochi-ken (JP)

(73) Assignee: Nippon Kodoshi Corporation, Kochi-ken (JP)

( * ) Notice: Subject to any disclaimer, the term of this patent is extended or adjusted under 35 U.S.C. 154(b) by 1142 days.

(21) Appl. No.: 11/153,917

(22) Filed: Jun. 16, 2005

(65) Prior Publication Data
US 2006/0014080 A1 Jan. 19, 2006

(30) Foreign Application Priority Data
Jun. 18, 2004 (JP) .............................. 2004-181909

(51) Int. Cl.
*H01M 2/16* (2006.01)
(52) U.S. Cl. ...................... 429/255; 429/247; 429/249; 29/623.1
(58) Field of Classification Search ........................ None
See application file for complete search history.

(56) References Cited

U.S. PATENT DOCUMENTS 5,366,832 A * 11/1994 Hayashi et al. ............. 429/249

2002/0182510 A1 * 12/2002 Cheiky et al. ............... 429/255
2004/0177935 A1 * 9/2004 Hamed et al. ................. 162/9

FOREIGN PATENT DOCUMENTS

FR 1511153 * 1/1968
JP 11-067181 * 3/1999

* cited by examiner

*Primary Examiner*—Jonathan Crepeau
*Assistant Examiner*—Tony Chuo
(74) *Attorney, Agent, or Firm*—Berenato & White, LLC

(57) ABSTRACT

A thin separator paper is provided for separating a positive electrode active material and a negative electrode active material from one another in alkaline battery. The separator paper has high gas tightness, high shortage preventing effect, and low deterioration. The separator paper possesses a crystalline structure in which cellulose 1 and cellulose 2 coexist. A ratio of the cellulose 2 is controlled in relation to the cellulose 1 and the separator paper is made by using an alkali treated pulp beaten from CSF 50 ml to 0 ml, as a raw material. The separator paper has the thickness between 15 μm and 60 μm, the gas tightness between 10 minutes/100 ml and 800 minutes/100 ml, and the area shrinkage rate which is not greater than 2%. Also provided is an alkaline battery containing the separator paper.

26 Claims, 5 Drawing Sheets

SEPARATOR PAPER FOR ALKALINE BATTERY AND THE ALKALINE BATTERY

CROSS-REFERENCE TO RELATED APPLICATIONS AND CLAIM TO PRIORITY

This application claims the benefit of priority of Japanese patent application 2004-181909 filed Jun. 18, 2004, the disclosure of which is incorporated herein by reference and to which priority is claimed.

FIELD OF THE INVENTION

The present invention relates to a separator paper for use in an alkaline battery such as, for example, an alkaline-manganese battery, a nickel-zinc battery, a silver oxide battery, or a zinc-air battery which uses zinc as a negative electrode active material. The present invention also relates to an alkaline battery using the separator paper, and particularly, to a thin separator paper which can prevent or reduce the occurrence of an internal shortage, and reduce the volume of separator paper in the alkaline battery.

BACKGROUND OF THE INVENTION

A characteristic property required of separator paper for isolating a positive electrode active material and a negative electrode active material in an alkaline-battery, is the ability to prevent internal shortages caused by touching of both electrode active materials or caused by an acicula (dendrite) of zinc oxide which is produced by discharge of the negative electrode. Another characteristic property is for separator paper to have a desirable durability, insofar as the separator paper desirably does not undergo shrinkage and deformation in the presence of electrolyte such as potassium hydroxide and the presence of positive electrode active material such as manganese dioxide, nickel oxy-hydroxide or silver oxide. At the same time, the separator paper should not block the ionic conduction.

Generally, separator paper for alkaline batteries uses a mixed fiber paper consisting of synthetic fiber and cellulose fiber. More specifically, the mixed fiber paper includes vinylon fiber of alkali proof synthetic fiber as the main material, viscose rayon fiber, linter pulp, mercerized wood pulp, and polynosic rayon fiber each of which is alkali proof cellulose fiber, and polyvinyl alcohol fiber added as a binder. On making the separator paper, the cellulose fiber such as the linter pulp, the mercerized wood pulp, and the polynosic rayon fiber, is subjected to beating treatment as needed, and fine fibril is produced from a fiber body, in order to give high fineness to the separator paper.

Although separator paper made by interweaving the synthetic fibers with the cellulose fibers has sufficient durability against the electrolyte and the active material, the separator paper has a pore size which is sufficiently large to create problems of internal shortages caused by touching of the active materials with one another or caused by the dendrite of zinc oxide which is produced from negative electrode. In order to overcome the above-mentioned problem of internal shortages, it is therefore required to cylindrically laminate the separator papers, each of which has a thickness of 100 µm, in triple or quadruple layers (thickness of 300 µm or 400 µm), on installing the separator papers in the alkaline battery. This measure of covering one separator paper with other separator papers makes the effective pore size smaller. In addition, a conditioner (inhibitor), which prevents growth of dendrite of zinc oxide, may be added to the electrolyte in order to prevent an internal shortage from occurring. Furthermore, it is required to overlap the separator paper with a separator material such as a cellophane film having ionic permeability and high shielding property.

The present applicant has disclosed techniques for preventing internal shortage in alkaline batteries using separator paper, in Japanese Unexamined Patent Publication Tokkai Hei 2-119049 and 10-92411 (hereinafter "JP 2-119049" and "JP 10-92411", respectively). The separator paper disclosed in JP 2-119049 is made by interweaving the synthetic fibers with the alkali proof cellulose fibers applicable for beating, such as the mercerized wood pulp or the polynosic rayon and includes alkali proof cellulose fiber falling within 10 to 50 weight %, and has a beating degree with the alkali proof cellulose fiber falling within a 500 to 0 ml range of CSF (Canadian Standard Freeness) value.

The separator paper disclosed in JP 10-92411 is made by lamination of dense layer and liquid keeping layer. The dense layer is made by interweaving the synthetic fibers with the alkali proof cellulose fibers applicable for beating and includes alkali proof cellulose fiber falling within 20 to 80 weight %, and has a beating degree of the alkali proof cellulose fiber falling within a 500 to 0 ml range of CSF value. The liquid keeping layer is made by interweaving the synthetic fibers with the alkali proof cellulose fibers and includes alkali proof cellulose fiber falling within 20 to 80 weight %, and has a beating degree of the alkali proof cellulose fiber which is not less than 700 ml of CSF value.

The above-described separator paper is made by laminating in triple or quadruple layers in order to prevent the internal shortage, on installing the separator paper in the alkaline battery. As a result, the installed separator paper has a thickness of about 300 µm.

When the number of laminated separator papers increases in the alkaline battery, the volume occupied by the separator paper increases in the alkaline battery. As a result, the available space for (and hence the amount of) positive electrode active material and negative electrode active material is reduced, thereby reducing the electric capacity of battery. Furthermore, the distance between the positive electrode and the negative electrode becomes longer as the number of laminated separator papers increases. When the distance between the electrodes becomes longer, the internal resistance of battery becomes large. Because voltage drop is based on the increase of internal resistance, the electric capacity of battery further reduces. In addition, high rate discharge having high electric current becomes poor when the internal resistance becomes large.

Under the circumstances, it is desirable to develop a thin separator paper having high gas tightness and high shielding property that is capable of occupying a reduced volume in the alkaline battery and preventing internal shortage, in order to further improve the electric properties such as increase of active materials, improvement of high rate discharge, increase of electric capacity, and reduction of internal resistance.

When the separator paper becomes thin, it is possible to reduce the internal resistance of the alkaline battery and it is possible to increase the electric capacity of the battery inasmuch as the available space for and the amount of active materials in the battery increase. However, the risk of internal shortages occurring in the battery increases when the separator paper is thin. More particularly, the produced dendrite (e.g., zinc oxide) grows from the negative electrode to the positive electrode, causing an internal shortage when the dendrite reaches to the positive electrode. The shortage occurs in a short time when using the thin separator paper having low shielding.

The above-mentioned JP 2-119049 is intended for preventing the internal shortage based on the dendrite of zinc oxide which occurs with low mercury of the negative electrode. However, the alkali proof cellulose fibers applicable for beating is not greater in amount than 50 weight % in the separator paper disclosed in JP 2-119049 and the separator paper disclosed therein has low shielding. When the separator paper has a thickness less than 300 µm in a dry condition, such as after being used in the battery, it is difficult to sufficiently prevent the internal shortage.

The above-mentioned JP 10-92411 is intended for preventing the internal shortage based on the dendrite of alkaline battery and improving heavy discharge (high rate discharge) property. In the obtained separator paper, the liquid keeping layer greatly expands in the electrolyte and keeps a great amount of electrolyte therein. As a result, it is possible to improve the high rate discharge property of the battery. However, it is necessary to reduce the amount of active materials inasmuch as the separator paper consequently occupies a large area in the battery when the separator paper expands in the battery. Although the high rate discharge property is improved, the electric capacity reduces in a low rate discharge.

In the above separator papers, natural cellulose pulp, which is a basic ingredient of mercerized pulp, has the crystalline structure of cellulose 1. On the other hand, the mercerized pulp having an improved alkali proof has the crystalline structure of cellulose 2.

For obtaining the improved alkali proof mercerized pulp, the wood such as coniferous tree and broad-leaved tree or non-wood such as Cotton linter and Manila hemp is subjected to a cooking treatment, in order to obtain the natural cellulose pulp. After the natural cellulose pulp is subjected to an immersing treatment in NaOH aqueous solution having concentration of 18 weight % to 25 weight %, the alkaline solution is removed from the natural cellulose pulp by water washing, in order to obtain the improved alkali proof mercerized pulp. In other words, a low molecular weight component such as hemicelluloses is dissolved and removed from the natural cellulose pulp having the crystalline structure of cellulose 1, by mercerizing treatment, in order to refine the cellulose. The natural cellulose pulp varies from the crystalline structure of cellulose 1 to alkaline cellulose. By removing the alkali solution by water washing, the natural cellulose pulp irreversibly varies from the alkaline cellulose to the crystalline structure of cellulose 2. The cellulose 2 has a crystalline structure of high alkali proof cellulose.

So, it is possible to reduce the solubility of the separator paper and to reduce size shrinkage of the separator paper in the electrolyte when the mercerized pulp is used as the separator paper for an alkaline battery. Accordingly, it is known that the shielding property of the separator paper is improved, when the mercerized pulp is subjected to beating treatment in order to fibrillate the mercerized pulp. The present applicant has offered the separator paper derived from the mercerized pulp, which is the alkali proof cellulose fiber capable of beating and which is highly beaten, in order to enhance gas tightness.

However, the present applicant has found it is difficult to fibrillate the mercerized pulp having the structure of cellulose 2 by the beating treatment. It is possible to easily beat non-mercerized pulp composed of the cellulose 1 till obtaining 0 ml in CSF value. On the other hand, the fibril's structure is strongly combined with other fibrils in the pulp fiber having the perfect crystalline structure of cellulose 2, and the fibrils are hardly produced by the beating treatment. Even if the fibrils are produced, the produced fibrils are easily cut off. As a result, it takes a long time to beat the pulp having the perfect cellulose 2. It is possible to carry out the beating treatment with respect to the pulp having the crystalline structure of cellulose 2 by mercerizing, although it takes a long time to beat the pulp having the cellulose 2 till 100 ml of CSF value. However, the produced fibrils and the pulp fibers are remarkably cut off when continuing the beating treatment. More specifically, it is difficult to reduce CSF value by the beating treatment in a region in which the CSF value is not greater than 50 ml. In this condition, new fibrils are hardly produced from the pulp fibers by the beating treatment. The pulp fibers and the fibrils are cut off and only the fiber length becomes short.

Even if the beaten pulp in this condition has a small CSF value which is representative of degree of beating, it is difficult to interweave high gas tightness separator paper by using the beaten pulp as raw material. The fibril produced by beating is cut off by continued beating and the fibril becomes a plurality of fine fiber pieces. As a result, the fine fiber pieces flow out through wire cloth of paper making and pinholes occur on the sheet. Under the circumstances, the tensile strength of the separator paper reduces and a plurality of pinholes exists in the separator paper. Accordingly, the pin holes in the separator paper cause an internal shortage of the electrode active materials to occur when the separation paper includes only a single layer or double layers, or when the thickness is not greater than 120 µm.

For example, the mercerized pulp, the linter pulp, prehydride pulp, the polynosic fiber, or the like are included as the alkali proof cellulose fiber capable of beating, in the above-mentioned Japanese patent publications. However, each of the mercerized pulp and polynosic fiber has the structure of perfect cellulose 2. It is difficult to carry out the beating treatment of cellulose 2 in high beating region of 50 ml to 0 ml of CSF value, as will be described hereinafter. Furthermore, it is difficult to sufficiently enhance gas tightness and sufficiently prevent internal shortage in a battery when the separator paper of the battery has a thickness which is not greater than about 120 µm. The above-mentioned problem is caused by the separator paper thickness of about 100 µm and the optimum gas tightness range of 2 seconds/100 ml to 100 seconds/100 ml, which are described in JP 10-92411.

Furthermore, the above-described separator paper made by interweaving the cellulose fiber with the synthetic fiber has insufficient endurance for prolonged use. In case of using regenerated cellulose fiber such as rayon fiber, polynosic fiber, solvent spun rayon fiber, or the like, the regenerated cellulose fiber deteriorates when contacted with the positive electrode active material over a long duration, inasmuch as the degree of polymerization of regenerated cellulose fiber is low in value, such as 200 to 600. As a result, the part dissolving in the electrolyte increases in the regenerated cellulose fiber. More particularly, the fine fiber portion which is fibrillated is easily dissolved. Inasmuch as the fine fiber portion selectively disappears, the shielding property of the separator paper is reduced in use. Therefore, there is a problem in which the internal shortage easily occurs in the battery.

On the other hand, the crystals of the dendrite become smaller in case of adding the inhibitor. As a result, the time at which the dendrite reaches the positive electrode becomes longer and the shortage rarely occurs in the battery. Although the addition of inhibitor restrains the growth of dendrite, the addition of inhibitor blocks the ionization of zinc in the negative electrode. Accordingly, the inhibitor reduces the discharging property of the battery.

It is also possible to use cellophane to prevent contact between the active materials and the resulting internal shortage based on the growth of dendrite. However, the separator paper has very high gas tightness and the movement of ions is restrained inasmuch as the cellophane has density of about 1.4 g/m$^3$. As a result, there is a problem in which the internal resistance becomes large in the battery. Furthermore, it is not possible to carry out the high rate discharge in the battery, because the cellophane has a large internal resistance.

The design of positive and negative electrodes has been reviewed in the alkaline battery recently. It is planned to promote the diffusion of ions on the surface of active materials and to improve the high rate discharge property in the alkaline battery by increasing the electrolytic contents of both positive and negative electrodes or increasing the surface area of each of the active materials. Therefore, a thin separator paper is required which has high shortage prevention effect, in order to improve the battery property by shortening the distance between the positive and negative electrodes and by reducing the electric resistance.

SUMMARY OF THE INVENTION

It is therefore an object of the present invention to provide a thin separator paper for an alkaline battery that reduces the deterioration against a positive electrode active material in a battery and has high gas tightness and high shortage prevention effect, for example, it is an object of the present invention to provide a separator paper having the thickness of 15 μm to 60 μm and the gas tightness of 10 minutes/100 ml to 800 minutes/100 ml. It is another object of the present invention to provide an alkaline battery capable of increasing the amount of active materials and having a large electric capacity and high rate discharge property by using the obtained separator paper whose thickness is not greater than 120 μm.

In order to accomplish the above-mentioned objects, there is provided a separator paper for isolating a positive electrode active material and a negative electrode active material of an alkaline-battery. According to a first aspect of the present invention, the separator paper comprises a crystalline structure in which cellulose 1 and cellulose 2 coexist. A ratio of the cellulose 2 is controlled in relation to the cellulose 1 and the separator paper is made by using an alkali treated pulp beaten from CSF 50 ml to 0 ml, as a raw material. The separator paper has thickness between 15 μm and 60 μm, gas tightness between 10 minutes/100 ml and 800 minutes/100 ml, and area shrinkage rate which is not greater than 2%. Furthermore, according to the present invention there is provided an alkaline battery containing the above-mentioned separator paper interposed between a positive electrode active material and a negative electrode active material in the alkaline battery.

According to a second aspect of the present invention, the separator paper has a ratio of cellulose 2 controlled from 40% to 90%, preferably, from 50% to 85% in relation to the cellulose 1. The separator paper includes an alkali treated pulp between 80 weight % and 100 weight %. A raw pulp is subjected to an alkali treatment by using NaOH aqueous solution having a concentration range between 10 weight % and 17 weight %, preferably, between 12 weight % and 17 weight %. Furthermore, the alkali treated pulp has an average fiber length in a range between 0.2 mm and 0.6 mm. The degree of polymerization is not less than 1000 in the alkali treated pulp. The alkali treated pulp is subjected to a low bleach or no bleach and has a brightness which is not greater than 60%. Also provided is an alkaline battery, in which the installed separator paper is used in a single layer structure or a double layer structure. In addition, the separator paper is interposed between a positive electrode and a negative electrode in a thickness range between 15 μm and 120 μm.

According the separator paper for alkaline battery and the alkaline battery obtained by the present invention, it is possible to make the thickness (for example, 15 μm to 60 μm) of the separator paper less than that realized by the separator papers described in the background section. It is also possible to form the separator paper having a high gas tightness (for example, 10 minutes/100 ml to 800 minutes/100 ml) which is capable of preventing the battery from an internal shortage on the basis of the dendrite of zinc oxide, inasmuch as the alkali treated pulp of raw material has the cellulose 1 and the cellulose 2 which coexist in each fiber. As a result, it is possible to install a thin separator paper in the alkaline battery. Inasmuch as it is possible to reduce the volume of separator paper in the alkaline battery, it is possible to improve electric properties of the battery, such as improvements including an increased amount of both active materials, high rate discharge performance, increased electric capacity, and a reduction of internal resistance.

BRIEF DESCRIPTION OF THE DRAWINGS

The accompanying drawings are incorporated in and constitute a part of the specification. The drawings, together with the general description given above and the detailed description of the preferred embodiments and methods given below, serve to explain the principles of the invention. In such drawings.

DETAILED DESCRIPTION OF PREFERRED EMBODIMENTS AND PREFERRED METHODS OF THE INVENTION

Description will be made as regards a separator paper for an alkaline battery and the alkaline battery according to preferred embodiments of the present invention. In the following embodiment, the present invention is characterized by having a crystalline structure in which a cellulose 1 and a cellulose 2 coexist as raw materials of the separator paper for alkaline battery and is characterized by using an alkali treated pulp controlling a ratio of the cellulose 2 with respect to the cellulose 1.

The alkali treated pulp used in embodiments of the present invention is obtained by immersing a wood pulp such as a coniferous tree_pulp, a broad-leaved pulp, or non-wood pulp such as a manila hemp pulp, a sisal hemp pulp, a cotton pulp, a linter pulp or the like, in an alkali aqueous solution. The alkali treated pulp has a crystalline structure in which the cellulose 1 and the cellulose 2 coexist. It is possible to use a strong alkali aqueous solution such as NaOH aqueous solution, KOH aqueous solution, LiOH aqueous solution, or the like, as the alkali solution. Taking available easiness and cost into consideration, it is preferable to subject each pulp to the alkali treatment by using NaOH aqueous solution.

A low molecular weight component such as hemicelluloses is dissolved and removed from a natural cellulose pulp by alkali treatment, in order to purify cellulose. Furthermore, the natural cellulose pulp firstly varies from the crystalline structure of cellulose 1 to alkali cellulose. By removing the alkali solution by water washing, the natural cellulose pulp irreversibly varies from the alkali cellulose to the crystalline structure of cellulose 2. The cellulose 2 is a crystalline structure of high alkali proof cellulose.

The alkali treated pulp is obtained without a dissolving process and a fiber spinning process in comparison to a regenerated cellulose fiber such as rayon fiber, polynosic fiber, cupro fiber, solvent spun rayon fiber, or the like. The alkali treated pulp is characterized in that deterioration is small in cellulose chains and the degree of polymerization is large in celluloses.

Figure 1:
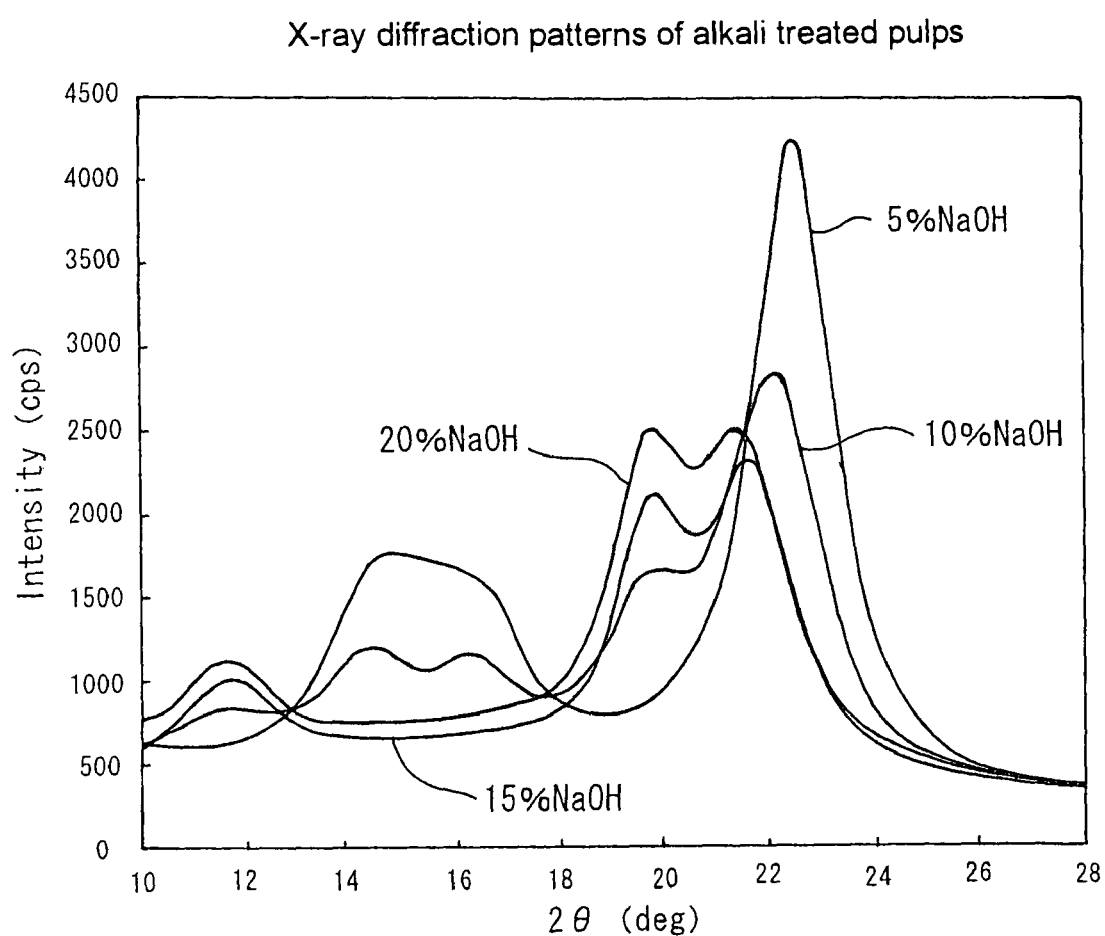
FIG. 1 shows a view of X-ray diffraction patterns of alkali treated pulps.
Figure 2:
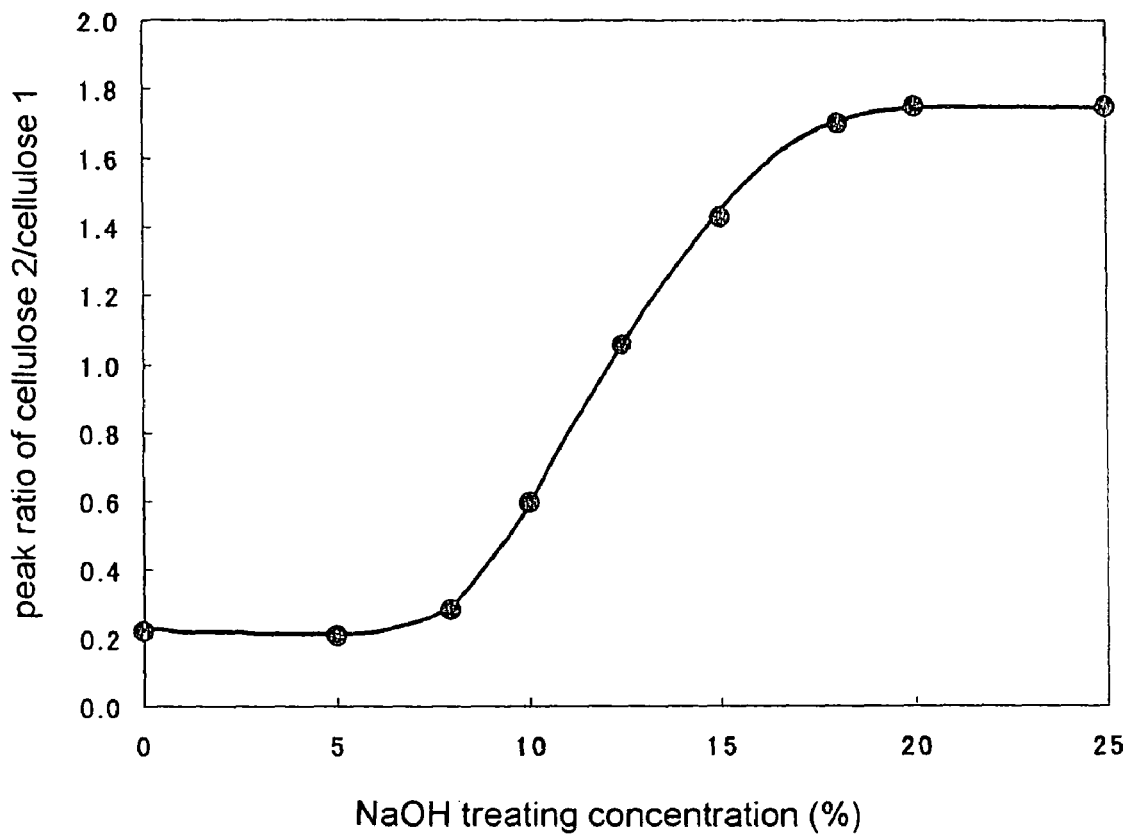
FIG. 2 is a graph for illustrating a relationship between a peak ratio of cellulose 2/cellulose 1 and the concentration of NaOH aqueous solution.
Figure 3:
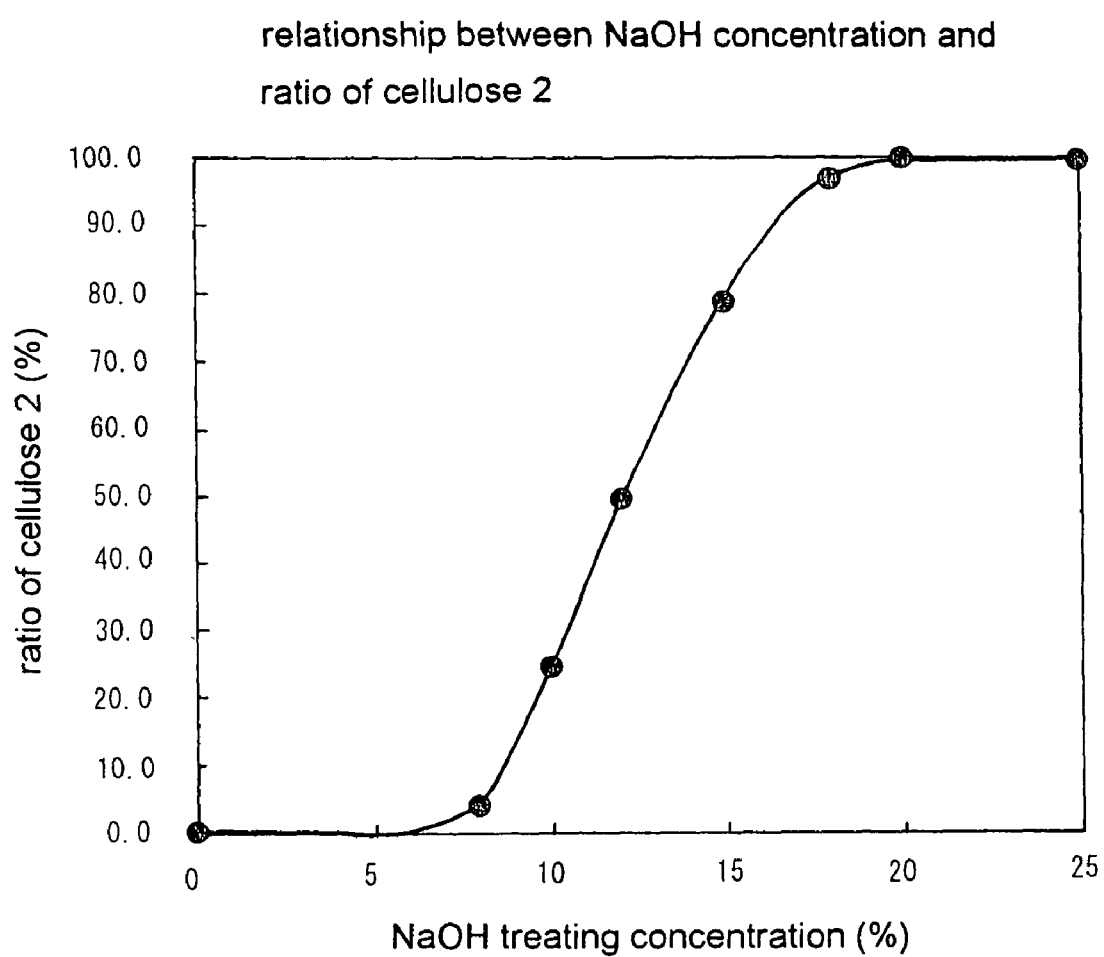
FIG. 3 is a graph for illustrating a relationship between a ratio of cellulose 2 and the concentration of NaOH aqueous solution.

In order to confirm states of variation from the cellulose 1 to the cellulose 2 based on the alkali treatment and to confirm a relationship between the alkali treatment and beating, the present inventor makes samples of alkali treated pulp that are obtained by immersing the coniferous tree pulp in NaOH aqueous solutions whose concentrations are 5 weight %, 12 weight %, 15 weight %, 17 weight %, 20 weight %, and 25 weight %, respectively. Furthermore, a sample is prepared without the alkali treatment. Incidentally, a temperature is equal to 25° C. on carrying out the alkali treatment by NaOH aqueous solution. The immersing time is equal to 30 minutes. Table 1 gives measured results of alkali proof (weight reduction ratio and area shrinkage) with respect to NaOH concentration of each sample. FIG. 1 shows X-ray diffraction patterns of each sample. FIG. 2 is a graph for illustrating relationship between the concentration of NaOH aqueous solution and peak ratio of cellulose 2/cellulose 1. FIG. 3 is a graph for illustrating relationship between the concentration of NaOH aqueous solution and ratio of cellulose 2.

TABLE 1

Measured result between alkali proof and NaOH concentration (%) in alkali treated pulp

| | no treatment | NaOH concentration | | | | | | |
| --- | --- | --- | --- | --- | --- | --- | --- | --- |
| | | 5% | 10% | 12% | 15% | 17% | 20% | 25% |
| weight reduction rate (%) | 6.5 | 1.8 | 1.2 | 1.3 | 1.2 | 1.1 | 1.2 | 1.2 |
| area shrinkage rate (%) | 18.3 | 17.8 | 7.6 | 4.1 | 3.4 | 2.6 | 2.4 | 2.4 |

On processing the pulps with various concentrations of NaOH aqueous solution, the values of weight reduction ratio (alkali proof) become approximate constant values of 1.3% to 1.1% when the concentration is not less than 10 weight % as readily understood from Table 1. It is thought that the cellulose component of low molecular weight component such as hemicellulose is removed in NaOH aqueous solution of comparatively low concentration. In addition, the area shrinkage (alkali proof) starts decreasing from NaOH concentration of approximate 10 weight % rapidly and becomes an approximate constant value in NaOH aqueous solution whose concentration is not less than 20 weight %.

The X-ray diffraction pattern shown in FIG. 1 is measured by using an X-ray tube having Cu target. Each of the pulp samples are made on a hand-made sheet having a thickness of about 2 mm and the sheet is attached to a sample holder in order to measure the X-ray diffraction pattern. As readily understood from FIG. 1, the sample treated by NaOH aqueous solution of 5 weight % has a remarkable peak of the cellulose 1 near 2θ=22.6 degrees which belongs to the cellulose 1. In the sample treated by NaOH aqueous solution of 10 weight %, the peak starts rapidly reducing near 2θ=22.6 degrees which belongs to the cellulose 1. Alternatively, the peak starts appearing near 2θ=21.5 degrees and 2θ=19.8 degrees each of which belongs to the cellulose 2. In the sample treated by NaOH aqueous solution of 20 weight %, the peak disappears near 2θ=22.6 degrees which belongs to the cellulose 1. The sample treated by NaOH aqueous solution of 20 weight % almost has the diffraction pattern of the cellulose 2. Incidentally, when comparing the peaks near 2θ=21.5 degrees with 2θ=19.8 degrees in the cellulose 2, the peak near 2θ=21.5 degrees is high in the sample treated by NaOH aqueous solution of 15 weight %. It is thought that the sample treated by NaOH aqueous solution of 15 weight % partially has the peak near 2θ=22.6 degrees which belongs to the cellulose 1. In the sample treated by NaOH aqueous solution of 20 weight %, the peak near 2θ=21.5 degrees which belongs to the cellulose 2 is approximately equal in height to the peak near 2θ=19.8 degrees which belongs to the cellulose 2.

A result shown in FIG. 2 is obtained when calculating a diffracted intensity ratio of the cellulose 2/cellulose 1 by comparing the diffracted X-ray intensity (peak heights) with respect to the peak near 2θ=19.8 degrees of the cellulose 2 and the peak near 2θ=22.6 degrees of the cellulose 1. As readily understood from FIG. 2, it is noted that the diffraction pattern of cellulose 2 is almost obtained in NaOH aqueous solution having the concentration which is not less than 18 weight % and the pulp is perfectly changed into the cellulose 2. On the basis of the diffracted intensity ratio of cellulose 2/cellulose 1, the ratio of cellulose 2 is calculated by the following method. In FIG. 2, only cellulose 1 exists and cellulose 2 disappears in the first range in which NaOH treating concentration is 0 weight % to 5 weight %. It will be assumed that the peak ratio of cellulose 2/cellulose 1 is R0 in the first range (In the example being illustrated in FIG. 2, R0=0.22). In addition, cellulose 1 disappears and only cellulose 2 exists in the second range in which NaOH treating concentration is 20 weight % to 25 weight %. It will be assumed that the peak ratio of cellulose 2/cellulose 1 is R100 in the second range (In the example being illustrated in FIG. 2, R100=1.75). It will be assumed that the cellulose 2 evenly increases between R0 and R100. The ratio of cellulose 2 is calculated by the peak ratio (Rs) of the cellulose 2/cellulose 1 in each sample in accordance with the following equation. More specifically, the ratio of cellulose 2 becomes 64% in the example being illustrated in FIG. 2 when Rs=1.20.

The ratio of cellulose 2=(Rs−R0)÷(R100−R0)×100.

Using data shown in FIG. 2, FIG. 3 shows the ratio of cellulose 2 which is calculated in accordance with the above mentioned equation. Incidentally, it is possible to use the peak near 2θ=11.8 degrees or 2θ=21.5 degrees of the cellulose 2 and the peak near 2θ=14.6 degrees or 2θ=16.3 degrees of the cellulose 1 on measuring the peak ratio of cellulose 2/cellulose 1, although using the peak near 2θ=19.8 degrees of the cellulose 2 and the peak near 2θ=22.6 degrees of the cellulose 1 on measuring the peak ratio of cellulose 2/cellulose 1 in FIG. 2. In addition, it is necessary to calculate the peak ratio of R0 and R100 in advance by using pulps which are measured objects, and to measure the peak ratio of cellulose 2/cellulose 1 by using a same X-ray measuring apparatus and under a same measuring condition of the X-ray diffraction pattern.

Figure 4:
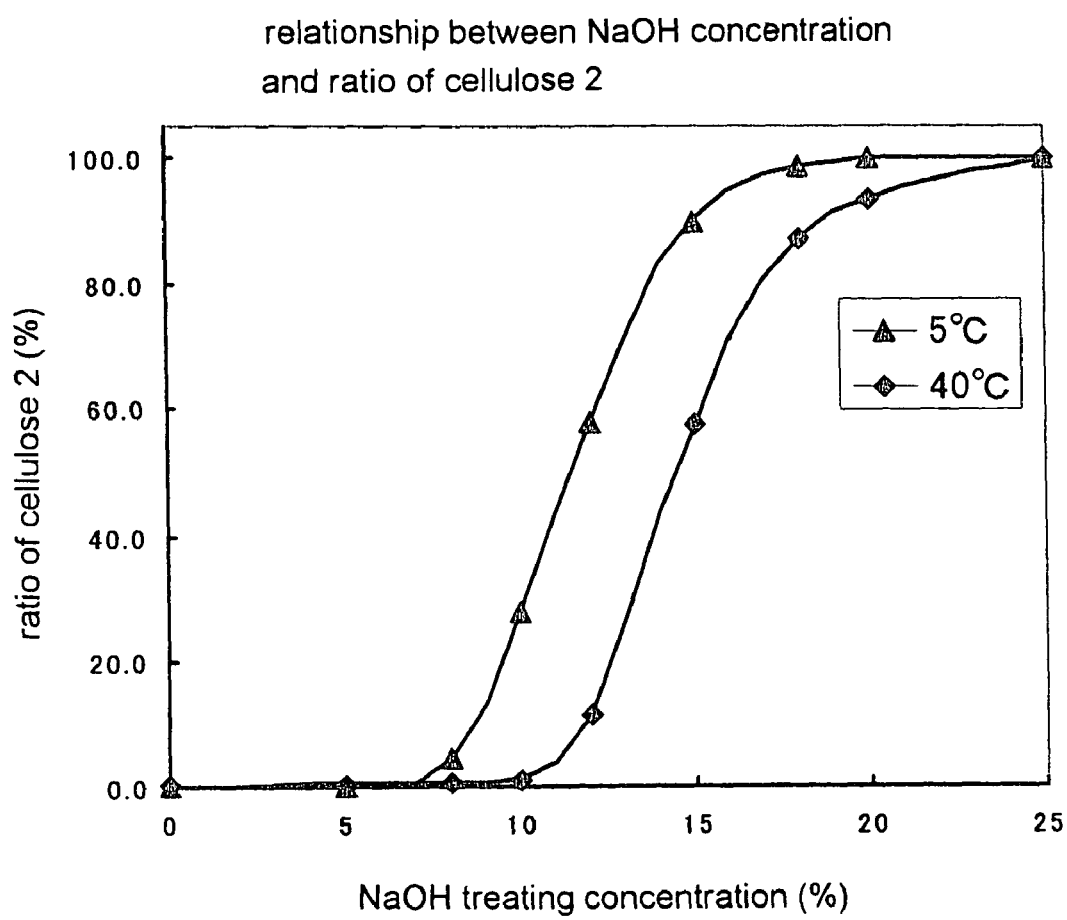
FIG. 4 is a graph for illustrating a relationship between a ratio of cellulose 2 and the concentration of NaOH aqueous solution.

Furthermore, the crystal variation from the cellulose 1 to the cellulose 2 is affected by the temperature on alkali treating the pulp although the crystal variation is mainly determined by the concentration of NaOH aqueous solution. FIG. 4 shows a result of the ratio of cellulose 2 in the alkali treated pulp which is made by treating the non-wood pulp by NaOH aqueous solution, at temperatures 5° C. and 40° C. In FIG. 4, the measuring method is used which is similar to the measuring method described in conjunction to FIG. 2. As readily understood from FIG. 4, the sample treated at the temperature of 5° C. starts varying to the cellulose 2 in NaOH concentration of about 7 weight %. On the other hand, the sample treated at the temperature of 40° C. starts varying the cellulose 2 in NaOH concentration of about 10 weight %. The conversion to cellulose 2 occurs in a low NaOH concentration in the sample treated at the temperature of 5° C. In addition, the sample treated at the temperature of 5° C. perfectly varies to the cellulose 2 in a low NaOH concentration in comparison to the sample treated at the temperature of 40° C. As described above, the conversion from the cellulose 1 to the cellulose 2 occurs in a low alkali concentration when the temperature is low in the alkali treatment. In addition, the conversion from the cellulose 1 to the cellulose 2 may be affected by alkali treating time, sorts of pulps, crystallization of natural cellulose, or the like. Therefore, the alkali treated pulp is defined by the ratio of cellulose 2 in the present invention inasmuch as the crystal variation from the cellulose 1 to the cellulose 2 is affected by the temperature of alkali treatment or the like.

From the above-mentioned results, the area shrinkage rate becomes a comparatively low value in the pulp sample in NaOH aqueous solution concentration which is not less than 10 weight % in which the structure of cellulose 2 starts appearing (Referring to Table 1). When the structure of cellulose 2 appears in the alkali treated pulp, it is noted that the area shrinkage rate (alkali proof) reduces. In other words, it is possible to reduce the dissolution and the size shrinkage rate of the separator paper in the alkali electrolyte when using the mercerized pulp having the crystalline structure of cellulose 2 as the separator paper for alkali battery. The shrinkage rate reduces in the alkali electrolytic solution with respect to the pulp fiber in the mercerized pulp having the crystalline structure of cellulose 2.

Figure 5:
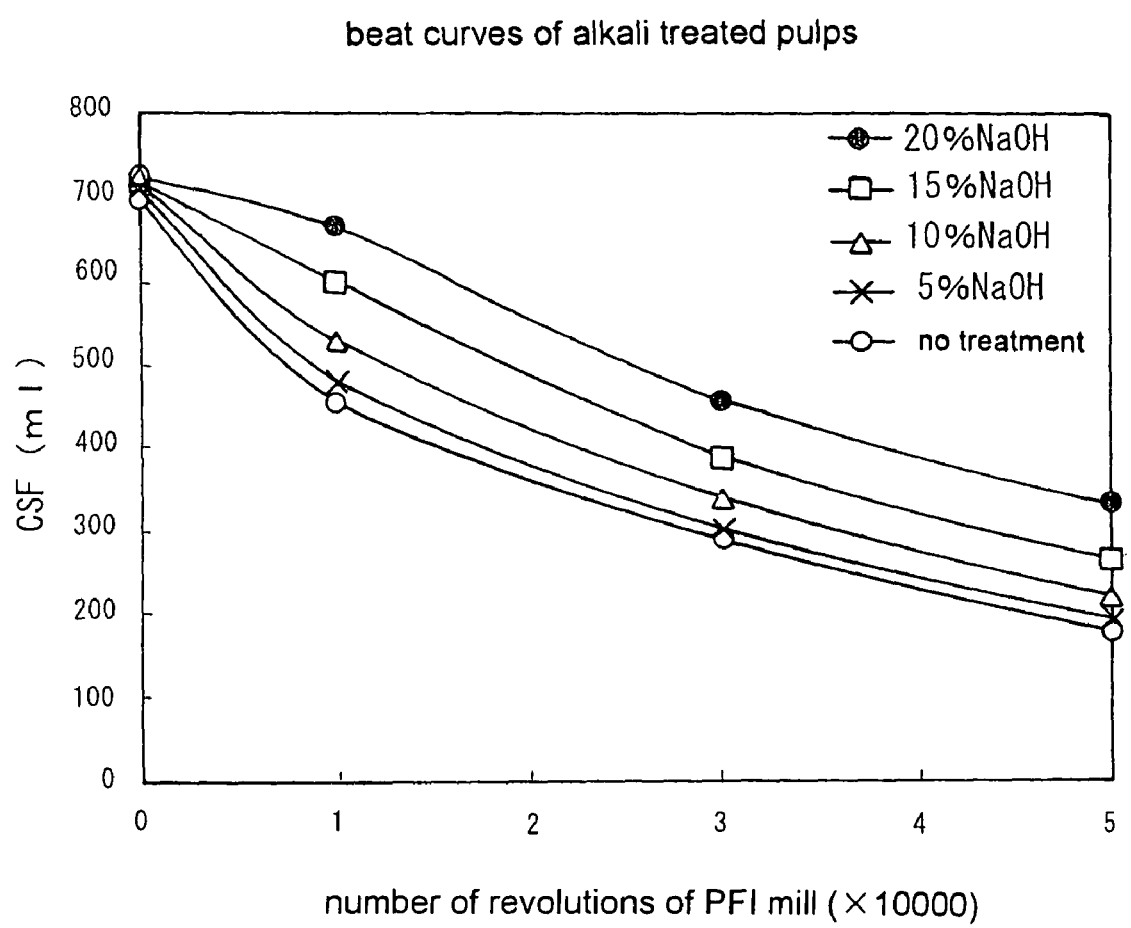
FIG. 5 is a graph for illustrating a beating curve of an alkali treated pulp.

Next, FIG. 5 gives a result in which the alkali treated pulp is subjected to a beating treatment by a PFI mill. The CSF value rapidly reduces with increase of the number of revolutions of PFI mill in the pulp composed of untreated cellulose 1. It is possible to easily beat the pulp composed of untreated cellulose 1. On the other hand, the reduction amount becomes small in the CSF value with relation to the number of revolutions of PFI mill as the concentration of NaOH aqueous solution increases. More particularly, the reduction amounts of CSF values are different from one another in an initial beating stage in which the number of revolutions of PFI mill is from 0 to 10000 revolutions. The reduction amount is smallest in the sample treated by NaOH aqueous solution of 20 weight %. In the initial beating stage, the fibrils loosen in the pulp fiber by the mechanical force which is applied to the pulp fiber and water enters in between the fibrils so that the fibrils are beaten. In the initial beating stage, the branches of fibril are hardly exposed to the outside of pulp fiber. The appearance of pulp fiber looks like no beating has taken place. The initial beating stage will be generally called an internal fibrillation. Therefore, the result of FIG. 5 shows that connection between fibrils constituting pulp fiber becomes strong with increased concentration of NaOH aqueous solution in the alkali treatment. It is most difficult to carry out the internal fibrillation with respect to the sample having the structure of cellulose 2 that is treated by NaOH aqueous solution of 20 weight %. As a result, the fiber is easily cut off by the beating treatment in the sample having the structure of cellulose 2 that is treated by NaOH aqueous solution of 20 weight %.

As readily understood from the above-mentioned results, it is noted that it is difficult to fibrillate the alkali treated pulp by the beating treatment when the alkali treated pulp is mercerized by NaOH aqueous solution having the concentration which is not less than 18 weight % and when the alkali treated pulp has the structure in which the ratio of cellulose 2 is approximately equal to 100%. In the pulp having the crystalline structure of cellulose 2, the fibril structures are strongly connected to one another in the pulp fiber. Even if the pulp is subjected to the beating treatment, it is difficult to produce the fibrils and the produced fibrils are easily cut off. As a result, it takes a long time duration to beat the pulp. Under the circumstances, it is impossible to make the separator paper possess high gas tightness by using as a raw material the mercerized pulp whose ratio of cellulose 2 is approximately equal to 100%, even if the mercerized pulp is subjected to the beating treatment in the CSF value of 50 ml to 0 ml. The fibrils produced by beating are cut off by continuation of beating and the tensile strength of the sheet is reduced. In addition, the cut fibrils become fine fiber pieces that flow out through wire cloth when making paper, and pinholes are formed on the sheet.

On the other hand, it is impossible to make effective separator paper using only natural cellulose or only cellulose 1 having the main crystalline structure of pulp which is mercerized in NaOH aqueous solution having the concentration which is not greater than 10 weight %.

Separation paper having thinness and high gas tightness and which has no area shrinkage in the alkali solution is produced in accordance with embodiments of the present invention as a result of carrying out examination with respect to the differences of alkali treating concentrations, a physical property of obtained pulp, a beaten property, and the property of the separator paper for alkaline battery. On the basis of the above-mentioned results, the selected raw material has a crystalline structure in which the cellulose 1 and the cellulose 2 coexist, wherein the ratio of cellulose 2 is controlled in relation to the cellulose 1. Further, the alkali treated pulp used is beaten in CSF value to 50 ml to 0 ml. The ratio of cellulose 2 is selected to the range between 40% and 90%, preferably, between 50% and 85% in relation to the cellulose 1.

Furthermore, it is possible to obtain separator paper whose thickness is 15 μm to 60 μm, whose gas tightness is 10 minutes/100 ml to 800 minutes/100 ml, and whose area shrinkage rate is not greater than 2% by adding the alkali treated pulp in the raw material in the range between 80 weight % and 100 weight %. In other words, it is possible to easily carry out the beating treatment in the present invention even though the crystal of cellulose 2 exists, inasmuch as the cellulose 1 and the cellulose 2 coexist in each fiber of the alkali treated pulp which is the raw material. In addition, it is difficult to cut off the fibrils which are produced by beating. Furthermore, it is possible to make the area shrinkage rate be small by existence of the cellulose 2.

The concentration of NaOH aqueous solution most affects the ratio of cellulose 2 of the alkali treated pulp. Furthermore, the temperature of NaOH aqueous solution affects the ratio of cellulose 2 of the alkali treated pulp. Accordingly, it is important to correctly control the concentration and the temperature of NaOH aqueous solution which is used in the alkali treatment, in order to control the ratio of cellulose 2 of the alkali treated pulp which is the raw material, to the range between 40% and 90%, preferably, between 50% and 85%, as described above.

Incidentally, it is preferable to recover and reuse NaOH aqueous solution used in the alkali treatment, taking cost into consideration, on continuous production of the alkali treated pulp. In this case, the concentration of NaOH aqueous solution at each treating unit is confirmed. In addition, it is necessary to consider that the low molecular weight component such as hemicellulose included in the raw pulp is dissolved to the recovered NaOH aqueous solution. The low molecular weight component such as hemicellulose is concentrated in the recovered alkali aqueous solution and causes trouble in relation to the conversion of cellulose 2. On the continuous production, it is desirable to continuously separate and remove the low molecular weight component such as hemicellulose by using an ion exchange membrane, an ultra-filtration membrane, or the like.

After mixing water to at least one of the alkali treated pulps on manufacturing the separator paper, in order to obtain slurry, the beating treatment is carried out by using a beating machine such as a conical refiner, a double disk refiner, or the like. The degree of beating is adjusted to the CSF value between 50 ml and 0 ml in the alkali treated pulp. Incidentally, it is desirable to enhance the gas tightness of separator paper in order to use the obtained separator paper in a single layer to the alkaline battery or to use the obtained separator papers in double layers to the alkaline battery. It is desirable to select the degree of beating to the CSF value between 50 ml and 0 ml in the alkali treated pulp.

It is preferable to make the average fiber length between 0.2 mm and 0.6 mm after beating the alkali treated pulp which is used in the separator paper. When the average fiber length is less than 0.2 mm, it is difficult to manufacture the separator paper inasmuch as the strength of wet paper is reduced while making the paper. Furthermore, the fibers flow out through the wire cloth while making the paper, and the pinholes are formed on the separator paper. As a result, the gas tightness of the separator paper is reduced so that an internal shortage easily occurs. When the average fiber length is greater than 0.6 mm, the CSF value inevitably becomes large and the internal shortage easily occurs in the battery on the basis of reduction of gas tightness. Preferably, the average fiber length is selected the range between 0.25 mm and 0.55 mm after beating.

Next, chemical fiber having high alkali proof is added into the alkali treated pulp which is subjected to the beating treatment. Then, the chemical fiber is sufficiently fibrillated, and is controlled to the crystalline structure in which the cellulose 1 and the cellulose 2 coexist, according to need, so as to include the chemical fiber in the range between 20 weight % and 0 weight % in relation to the weight of the separator paper. After that, the chemical fiber is evenly mixed with the alkali treated pulp which was fibrillated.

When the chemical fiber for use in the separator paper has a fine fiber diameter and a short fiber length, the pinholes are hardly formed in the separator paper. Preferably, the fiber diameter is not greater than 2.0 decitex and the fiber length is not greater than 3 mm. More specifically, an optimum fiber diameter of the chemical fiber is not greater than 1 decitex and an optimum fiber length is between 1 mm and 2 mm. In addition, the fiber diameter of chemical fiber is relative to the thickness of separator paper. It is desirable to make the fiber diameter of short axis direction in the cross sectional surface be equal to or less than ½ of the thickness of the separator paper. Furthermore, the chemical fiber preferably has a depressed shape such as an ellipse instead of circular shape in the cross sectional shape. If the fiber diameter of short axis direction in the cross sectional surface is greater than ½ of the thickness of separator paper, the pinholes are easily formed in the separator paper. When the raw material for making paper is prepared as described above and the raw material is processed into a sheet shape by the paper making method, it is possible to obtain the separator paper for alkali battery according to the present invention.

In the paper making method of the separator paper, the prepared raw material is diluted with water in order to obtain a raw material concentration between 0.1% and 1%. The water including the raw material pours on wire cloth and is evenly spread on the wire cloth for the paper making. The water is aspirated through the wire cloth by suction in order to form a wet paper having an even thickness on the wire cloth. Next, the formed wet paper is pressed by resin rolls in order to remove excess water from the wet paper. After that, the wet paper is continuously transferred to the surfaces of a plurality of cylinder dryers which are heated by steam, and excess moisture is gradually evaporated from the wet paper in order to dry the wet paper. As a result, it is possible to obtain the separator paper according to the present invention.

Furthermore, the above-mentioned separator paper is used as a separator paper which isolates the positive electrode active material from the negative electrode active material, in the alkaline battery. The above-mentioned separator paper intervenes between the positive electrode and the negative electrode in which zinc particles are used as the active material in the alkali electrolyte-impregnated battery. More particularly, the separator paper is interposed between the positive electrode and the negative electrode as a single layer structure with a thickness between 15 μm and 120 μm. Alternatively, the separator papers may be interposed between the positive electrode and the negative electrode as a double layer structure with a thickness between 15 μm and 120 μm. Incidentally, it is preferable to use the double layer structure of separator papers in order to enhance reliability, instead of the single layer structure. In instances where the entire thickness of layer structure is not greater than about 120 μm, it is possible to use a layer structure having triple layers or more.

Inasmuch as the prepared raw material is beaten to about 0 ml in the CSF value and inasmuch as it is difficult to filter the water through the wire cloth during paper making, it is preferable to use a Fourdrinier paper machine which is capable of taking a water filtering time duration on the wire cloth or use a twin-wire paper machine which is capable of filtering water from both surfaces of wet paper, as a paper making machine which is used on manufacturing the separator paper.

According to an embodiment, the separator paper has a thickness range between 15 μm and 60 μm and the area shrinkage rate not greater than 2%. In cases where the thickness of the separator paper is less than 15 μm, the strength of wet paper reduces and the wet paper is easily cut off on manufacturing. As a result, it is difficult to manufacture the separator paper. In addition, the fine fibers flow out through the wire cloth and the pinholes are formed in the separator paper. As a result, it is difficult to prevent the shortage in the battery. In case the thickness of the separator paper is greater than 60 μm, it is difficult to filter water from the wire cloth and it is difficult to shape the wet paper into a sheet shape, inasmuch as the wet paper includes much water. In addition, when the separator papers each of which has the thickness greater than 60 μm are laminated in a double layer structure and are used in the battery, the high rate discharge property of the battery deteriorates because of the large density of the separator papers, and the electric resistance greatly increases, although the thickness is thin in comparison to the conventional separator papers. Preferably, the thickness range of the separator paper is between 20 μm and 50 μm.

The gas tightness degree range of the separator paper is between 10 minutes/100 ml and 800 minutes/100 ml. If the gas tightness degree is less than 10 minutes/100 ml, pinholes may be formed in the separator paper, and a single layer structure may be insufficient to prevent the shortage in the battery. If the gas tightness degree is greater than 800 minutes/100 ml, the separator paper has a large electric resistance as good as cellophane and the high rate discharge property is easy to reduce, although it is sufficient to prevent the shortage in the battery.

In the technique described in the background section for manufacturing separator paper, polyvinyl alcohol fibers each of which is dissolved in hot water having temperature between 50° C. and 80° C. are mixed to the raw material about 10 weight %. The polyvinyl alcohol fibers are dissolved by water included in the wet paper, in the drying process for making paper, in order to bond the fibers to one another. On the other hand, it is unnecessary to add the binder such as polyvinyl alcohol inasmuch as the necessary strength is obtained by hydrogen bond between the fibrillated pulp fibers, in the separator paper according to the present embodiment. When a water-soluble binder is added to the separator paper, the electric resistance of the separator paper remarkably increases. It is possible to obtain a good result when the added amount of polyvinyl alcohol fiber dissolved in the hot water is not greater than 5 weight % in relation to the weight of the separator paper.

In the pulp which is highly beaten and which is used in the present embodiment, the appearance of pulp fiber before beating is not recognized and the pulp according to the present embodiment is almost fibrillated into a fibril state. When the water-soluble binder such as polyvinyl alcohol is added to such a highly beaten pulp, the binder enters into fibrils and the fibrils are bonded by the binder. Even though such a separator paper is immersed in the electrolyte, it is difficult to make the electrolyte enter into the fibrils. As a result, the electric resistance becomes very large. On the other hand, inasmuch as the fibrils are bonded to one another by hydrogen bond without binder, it is possible to make the electrolyte easily enter in fibrils because the hydrogen bond is cut off when the separator paper is immersed in the alkali electrolyte. As a result, it is possible to reduce the electric resistance.

The crystalline structure of alkali treated pulp is mainly determined by the concentration of NaOH aqueous solution. In addition, the crystalline structure of alkali treated pulp is affected by the temperature on alkali treatment and is affected by the properties of material of natural cellulose pulp. The ratio of cellulose 2 of the alkali treated pulp is selected to the range between 40% and 90%, preferably, between 50% and 85%. When the ratio cellulose 2 is less than 40%, the separator paper greatly contracts in the alkali electrolytic solution inasmuch as the alkali proof is lacking the obtained separator paper. When the ratio cellulose 2 is greater than 90%, it is difficult to beat the pulp and the gas tightness is easy to reduce. As a result, it is difficult to prevent the shortage when using the separator paper in the battery. The alkali treated pulp having above-mentioned range is easily beaten and it is possible to obtain the separator paper which is capable of reducing the area shrinkage rate in the electrolyte.

It is possible to make the separator paper by mixing the pulp having a structure of perfect cellulose 2, into the pulp in which the cellulose 1 and the cellulose 2 between 40% and 90% coexist. Alternatively, it is possible to make the separator paper by mixing the pulp having a structure of cellulose 1, into pulp in which the cellulose 1 and the cellulose 2 between 40% and 90% coexist. The pulp having the structure of cellulose 1 is obtained by being subjected to the alkali treatment by NaOH aqueous solution of a low concentration in order to remove soluble components. The pulp having the structure of cellulose 1 has high α-cellulose content which is not less than 97%. In this case, the pulp having the structure of perfect cellulose 2 is mixed into coexistence pulp in which the ratio of cellulose 1 is large. Alternatively, the pulp having a structure of perfect cellulose 1 is mixed into coexistence pulp in which the ratio of cellulose 2 is large. It is desirable to control the ratio of cellulose 2 to the preferable range between 50% and 85% in the mixed pulp. When the ratio of cellulose 2 is greater than 85% in the mixed pulp, it is difficult to beat the mixed pulp and the gas tightness degree reduces in the separator paper.

When the ratio of cellulose 2 is less than 50% in the mixed pulp, the size shrinkage of separator paper increases in the electrolyte. As a result of the shrinkage of the separator paper, the active materials of the battery are contact with each other and there is a trouble in which the internal shortage occurs. In addition, when the alkali treated pulp for use in the separator paper has the degree of polymerization which is not less than 1000, the electrolyte and the positive electrode active material hardly deteriorate the separator paper, and it is possible to impart to the separator paper a high shortage preventing effect.

Bleached pulps such as NBKP, NBSP or the like are pulps whose brightness value is about 75%. Although lignin, which is a coloring agent, is oxidized in a pulp bleaching process, the cellulose is also oxidized in the bleaching process. As a result, many bleached pulps have a degree of polymerization decreased to 1000 or less. Even if such a pulp is subjected to alkali treatment, the degree of polymerization is a low value, making the pulp inappropriate for use in the thin separator paper. More particularly, the separator paper prepared from the beaten alkali treated pulp having a low degree of polymerization deteriorates in the battery and the internal shortage easily occurs.

It is desirable to carry out the alkali treatment with respect to the pulp without the pulp being exposed to air. Although the pulp is converted from the cellulose 1 to the alkali cellulose in the first stage of alkali treatment, the alkali cellulose has a great activity in this middle stage and the degree of polymerization reduces by air oxidation. If the pulp is immersed in the alkali solution on the alkali treatment, the pulp is not directly exposed to air and the degree of polymerization hardly reduces. The cellulose component of low molecular weight increases in the pulp, thereby greatly decreasing the degree of polymerization. Also, many components dissolve in electrolyte after processing the alkali treatment and the alkali proof reduces. When the separator paper has many soluble components, the soluble components are dissolved in the battery and are oxidized by the positive electrode active material. As a result, self-discharge occurs in the battery and the electric capacity reduces in the battery.

The alkali treated pulp having the degree of polymerization which is not less than 1000 is appropriate for the separator paper. More particularly, it is optimum to use the pulp of a low bleaching in which the brightness is not greater than 60% or to use non-bleached pulp, inasmuch as the degree of polymerization becomes large in the cellulose. For example, it is possible to obtain the pulp whose degree of polymerization is between 1300 and 2000, when the non-bleached pulp is subjected to the alkali treatment. The separator paper including such an alkali treated pulp is hardly deteriorated by the electrolyte and the positive electrode active material, and the fibrils produced by beating are hardly dissolved in the electrolyte. As a result, it is possible to obtain separator paper having a high shortage preventing effect in the battery.

In order to enhance the shortage preventing effect by enhancing the gas tightness degree of the separator paper, the alkali treated pulp is included in the separator paper in the range between 80 weight % and 100 weight % in relation to the weight of separator. When the content of alkali treated pulp is less than 80 weight %, the pinholes or holes are easily formed in the separator paper. As a result, the gas tightness degree reduces in the separator paper. Therefore, the optimum content of alkali treated pulp is selected in the range between 80 weight % and 100 weight %.

The chemical fiber mixed into the separation paper preferably undergoes little dissolution and little shrinkage in relation to the alkali electrolyte. Such a fiber may be, for example, vinylon fiber which is insoluble fiber obtained by acetalization of polyvinyl alcohol fiber or obtained by heat drawing of polyvinyl alcohol fiber. The vinylon fiber is not dissolved in water of temperature which is not greater than 100° C. In addition, such a fiber may be, for example, polyamide fibers (nylon 6 or nylon 66), polyolefin fibers (polypropylene fiber or polyethylene fiber), composite fibers (polypropylene/polyethylene bicomponent fiber, polypropylene/degenerative polypropylene bicomponent fiber, or polyamide/degenerative polyamide bicomponent fiber), synthetic pulps (pulp state material manufactured from polypropylene resin and polyethylene resin by a flash spinning method), or regenerated cellulose fibers (high alkali proof material such as polynosic fiber, cupro fiber, solvent spun rayon fiber). Each of the chemical fibers preferably has the alkali proof in which the weight reduction is not greater than 3% and the area shrinkage rate is not greater than 5% with respect to 40% KOH solution.

Of the above-mentioned chemical fibers, the vinylon fiber has a high alkali proof and a high rigidity. Inasmuch as the separator paper is imparted with a high rigidity by mixing the vinylon fiber in the separator paper, it is possible to easily form the separator paper into a separator cylinder or tube having a circular shape in a sectional view, on processing the separator paper into a cylindrical shape, and to improve the cylindrical workability. In addition, among regenerated cellulose fibers, fibers (polynosic fiber, cupro fiber, or solvent spun rayon fiber) which are capable of being beaten and being fibrillated can be beaten and mixed with separator paper. Incidentally, the surface portion is fibrillated in such a regenerated cellulose fiber capable of being beaten. The central portion of fiber is not fibrillated by beating. When the beating continues, the produced fibrils and fibers are cut off. Therefore, in the beating treatment of the regenerated cellulose fiber, it is preferable to beat the fiber separately from the alkali treated pulp and to mix the same with the alkali treated pulp after beating. Each of the polynosic fiber and the cupro fiber has the crystalline structure of cellulose 2.

The X-ray diffraction pattern of solvent spun rayon fiber has a peak near 2θ=20.6 degrees that is obtained by combining the peak near 2θ=21.5 degrees of cellulose 2 to the peak near 2θ=19.8 degrees of cellulose 2. Although it cannot be defined as cellulose 2, the solvent spun rayon fiber has a little size shrinkage in the electrolyte in comparison to the polynosic fiber and the cupro fiber. The solvent spun rayon fiber is a high alkali proof cellulose fiber having a crystalline structure similar to the cellulose 2.

Description will proceed to embodiments of the separator paper for alkali battery and the alkali battery according to the present invention, comparison examples, and conventional examples.

Embodiment 1

Non Bleached coniferous tree pulp of 600 kg is immersed in NaOH aqueous solution of 8.5 t (ton) that has the concentration of 15 weight %, in order to break the pulp in the NaOH aqueous solution. After breaking, the NaOH aqueous solution is left at rest during 0.5 hours. After pressing the pulp slurry by a belt pressing extractor in order to remove excessive alkali solution, the alkali treated pulp is thrown into water in order to remove the alkali solution from the alkali treated pulp. After neutralizing the alkali treated pulp by $H_2SO_4$, the alkali treated pulp is washed with water. The pulp slurry is again pressed and is dried in order to obtain an alkali treated pulp (the ratio of cellulose 2 is 75%, the degree of polymerization is 1350, and the brightness is 53%) of 500 kg that has a crystalline structure in which the cellulose 1 and the cellulose 2 coexist. After breaking the alkali treated pulp of 500 kg in water of 14 t in order to obtain a pulp slurry, the pulp slurry is subjected to the beating treatment until the CSF value becomes 0 ml by using a double disk refiner (DDR), in order to fibrillate the fibers. The average fiber length is 0.30 mm after the beating treatment and the time for the beating treatment is 6 hours. Separator paper for an alkali battery (embodiment 1-1) having a thickness of 17.2 μm, a gas tightness of 168 minutes/100 ml, and a area shrinkage rate of 0.3% is obtained by making paper with a Fourdrinier paper machine, using the beaten alkali treated pulp as a raw material.

Embodiment 2

Bleached Manila hemp pulps of 600 kg are immersed in NaOH aqueous solution of 6.0 t that has the concentration of 14 weight %, in a condition of pulp sheets. After immersing, the pulp sheets are left at rest during 5 hours. Next, the pulp sheets including the alkali solution are put in a pile and are pressed by a hydraulic press machine, in order to remove the excessive alkali solution from the pulp sheets. The alkali treated pulp sheets are thrown into water to be broken in water, in order to obtain pulp slurry. After the pulp slurry is washed with water and is neutralized, the pulp slurry is pressed by the belt pressing extractor and is dried in order to obtain an alkali treated pulp (the ratio of cellulose 2 is 60%, the degree of polymerization is 1100, and the brightness is 76%) of 530 kg that has a crystalline structure in which the cellulose 1 and the cellulose 2 coexist. After breaking the alkali treated pulp of 530 kg in water of 14 t in order to obtain a pulp slurry, the pulp slurry is subjected to the beating treatment until the CSF value becomes 0 ml by using a double disk refiner (DDR), in order to fibrillate the fibers. The average fiber length is 0.35 mm after the beating treatment and the time for the beating treatment is 7 hours. Heat treated vinylon fibers (polyvinyl alcohol fibers which are subjected to a heat-drawing treatment in order to make the fibers be insoluble in hot water; the fiber diameter is 1.7 decitex and the fiber length is 2 mm) of 55 kg are added to the beaten alkali treated pulps and sufficient mixture is carried out in order to obtain a raw material for making paper. The content of cellulose fibers is 90.6 weight % in relation to the raw material for making paper. Separator paper for an alkali battery (embodiment 2-1) having a thickness of 30.2 μm, a gas tightness of 65 minutes/100 ml, and an area shrinkage rate of 0.2% is obtained by making paper from the raw material by using the Fourdrinier paper machine.

Embodiment 3

Non-bleached coniferous tree pulps are immersed in NaOH aqueous solutions having the concentration from 10 weight % to 17 weight %. A procedure similar to that of the embodiment 1 is used in order to obtain alkali treated pulps (the ratio of cellulose 2 is 22%, the degree of polymerization is 1460 and the brightness is 50%, etc.) that has a crystalline structure in which the cellulose 1 and the cellulose 2 coexist. Using a procedure similar to that of the embodiment 1, the alkali treated pulps are subjected to the beating treatment until the CSF value becomes 0 ml. The average fiber length is 0.38 mm after the beating treatment and the time for the beating treatment is 5 hours (embodiment 3-1). Separator paper for an alkali battery (embodiment 3-1) having a thickness of 30.5 μm, a gas tightness of 396 minutes/100 ml, and an area shrinkage rate of 3.5% is obtained by making paper from the beaten alkali treated pulp by using the Fourdrinier paper machine.

Embodiment 4

Bleached coniferous tree pulp is immersed in NaOH aqueous solution having the concentration of 11.5 weight %. A procedure similar to that used in the embodiment 1 is used in order to obtain alkali treated pulp (the ratio of cellulose 2 is 38%, the degree of polymerization is 1050, and the brightness is 72%) of 500 kg that has a crystalline structure in which the cellulose 1 and the cellulose 2 coexist. After breaking the alkali treated pulp of 500 kg in water in order to obtain a pulp slurry, the pulp slurry is subjected to the beating treatment until the CSF value becomes 30 ml by using the double disk refiner (DDR), in order to fibrillate the fibers. The average fiber length is 0.50 mm after the beating treatment and the time for the beating treatment is 4.5 hours. Vinylon fibers (which is PVA fibers insolubilized to hot water by formalization and whose fiber diameter is 0.4 decitex and the fiber length is 2 mm) of 85 kg are added to the beaten alkali treated pulps and sufficient mixture is carried out in order to obtain a raw material for making paper. The content of cellulose fibers is 85.5 weight % in relation to the raw material for making paper. Separator paper for an alkali battery having a thickness of 57.2 μm, a gas tightness of 25 minutes/100 ml, and an area shrinkage rate of 0.9% is obtained by making paper from the raw material by using the Fourdrinier paper machine.

Embodiment 5

Cotton pulp (pulp obtained by cooking of cotton cloth or cotton yarn) is immersed in NaOH aqueous solution having the concentration of 15 weight %. A procedure similar to that of the embodiment 1 is used in order to obtain alkali treated pulp (the ratio of cellulose 2 is 78%, the degree of polymerization is 1750, and the brightness is 76%) of 500 kg that has a crystalline structure in which the cellulose 1 and the cellulose 2 coexist. After breaking the alkali treated pulp of 500 kg in water in order to obtain a pulp slurry, the pulp slurry is subjected to the beating treatment until the CSF value becomes 3 ml by using the double disk refiner (DDR), in order to fibrillate the fibers. The average fiber length is 0.38 mm after the beating treatment and the time for the beating treatment is 6 hours. The fibers of nylon 6 (the fiber diameter is 0.6 decitex and the fiber length is 2 mm) of 50 kg are added to the beaten alkali treated pulps and sufficient mixture is carried out in order to obtain a raw material for making paper. The content of cellulose fibers is 90.9 weight % in relation to the raw material for making paper. Separator paper for an alkali battery having a thickness of 50.5 μm, a gas tightness of 136 minutes/100 ml, and an area shrinkage rate of 0.3% is obtained by making paper from the raw material by using the Fourdrinier paper machine.

Embodiment 6

Non-bleached coniferous tree pulp is immersed in NaOH aqueous solution having the concentration of 13 weight %. A procedure similar to that of the embodiment 1 is used in order to obtain alkali treated pulp (the ratio of cellulose 2 is 58%, the degree of polymerization is 1350, and the brightness is 56%) of 410 kg that has a crystalline structure in which the cellulose 1 and the cellulose 2 coexist. After breaking the alkali treated pulp of 410 kg in water in order to obtain a pulp slurry, the pulp slurry is subjected to the beating treatment until the CSF value becomes 0 ml by using the double disk refiner (DDR). Furthermore, after breaking solvent spun rayon fiber (Acordis Ltd., Lyocell, the fiber diameter is 1.7 decitex, the fiber length is 4 mm, and the degree of polymerization is 520) of 90 kg in water in order to obtain a pulp slurry, the pulp slurry is subjected to the beating treatment until the CSF value becomes 60 ml by using the double disk refiner (DDR). Both of the raw materials are mixed after beating. The CSF value after mixture is 0 ml and the average fiber length is 0.25 mm. Separator paper for an alkali battery having a thickness of 40.7 μm, a gas tightness of 29 minutes/100 ml, and an area shrinkage rate of 0.5% is obtained by making paper from the raw material by using the Fourdrinier paper machine.

Embodiment 7

Non-bleached coniferous tree pulp is immersed in NaOH aqueous solution having the concentration of 12.3 weight %. A procedure similar to that used in the embodiment 1 is used in order to obtain alkali treated pulp A (the ratio of cellulose 2 is 55%, the degree of polymerization is 1450, and the brightness is 56%) of 375 kg that has a crystalline structure in which the cellulose 1 and the cellulose 2 coexist. Furthermore, bleached coniferous tree pulp is immersed in NaOH aqueous solution having the concentration of 21 weight %. A procedure similar to that of the embodiment 1 is used in order to obtain alkali treated pulp B (the ratio of cellulose 2 is 100%, the degree of polymerization is 950, and the brightness is 77%) of 125 kg that has a crystalline structure in which the cellulose 1 and the cellulose 2 coexist. After mixing the alkali treated pulp A with the alkali treated pulp B which are broken in water, in order to obtain a pulp slurry, the pulp slurry is subjected to the beating treatment until the CSF value becomes 1 ml by using the double disk refiner (DDR), in order to fibrillate the fibers. The average fiber length is 0.28 mm after the beating treatment and the time for the beating treatment is 7 hours. The ratio of cellulose 2 becomes 66.3 weight % by mixing the alkali treated pulp A to the alkali treated pulp B. Separator paper for an alkali battery having a thickness of 30.3 μm, a gas tightness of 228 minutes/100 ml, and an area shrinkage rate of 0.2% is obtained by making paper from the raw material by using the Fourdrinier paper machine.

Embodiment 8

Non-bleached coniferous tree pulp is immersed in NaOH aqueous solution having the concentration of 16 weight %. A procedure similar to that used in the embodiment 1 is used in order to obtain alkali treated pulp A (the ratio of cellulose 2 is 85%, the degree of polymerization is 1330, and the brightness is 57%) of 350 kg that has a crystalline structure in which the cellulose 1 and the cellulose 2 coexist. Furthermore, non bleached sisal hemp pulp is immersed in NaOH aqueous solution having the concentration of 5 weight %. A procedure similar to that of the embodiment 1 is used in order to obtain alkali treated pulp B (the ratio of cellulose 2 is 0%, the degree of polymerization is 1400, and the brightness is 59%) of 150 kg that has a crystalline structure in which the cellulose 1 and the cellulose 2 coexist. After mixing the alkali treated pulp A to the alkali treated pulp B which are broken in water, in order to obtain a pulp slurry, the pulp slurry is subjected to the beating treatment until the CSF value becomes 0 ml by using the double disk refiner (DDR), in order to fibrillate the fibers. The average fiber length is 0.38 mm after the beating treatment and the time for the beating treatment is 6 hours. The ratio of cellulose 2 becomes 59.5 weight % by mixing the alkali treated pulp A to the alkali treated pulp B. Separator paper for an alkali battery having a thickness of 40.0 µm, a gas tightness of 520 minutes/100 ml, and an area shrinkage rate of 0.8% is obtained by making paper from the raw material by using the Fourdrinier paper machine.

Embodiment 9

Bleached coniferous tree pulp is immersed in NaOH aqueous solution of 8.5 t that has the concentration of 16 weight %, in order to break the pulp to the NaOH aqueous solution. After breaking, the NaOH aqueous solution is left at rest for 0.5 hours. After pressing the pulp slurry by the belt pressing extractor in order to remove excessive alkali solution from the pulp slurry, cake shaped pulp from which the solution is removed is exposed to air in order to oxidize the cake shaped pulp and to reduce the degree of polymerization. The alkali treated pulp is thrown into water in order to attenuate the alkali solution. Furthermore, after the alkali treated pulp is neutralized by sulfuric acid, the alkali treated pulp is washed with water. The pulp slurry is again pressed and is dried in order to obtain an alkali treated pulp (the ratio of cellulose 2 is 80%, the degree of polymerization is 610, and the brightness is 79%) of 500 kg that has a crystalline structure in which the cellulose 1 and the cellulose 2 coexist. After breaking the alkali treated pulp of 500 kg in water in order to obtain a pulp slurry, the pulp slurry is subjected to the beating treatment until the CSF value becomes 0 ml by using a double disk refiner (DDR), in order to fibrillate the fibers. The average fiber length is 0.26 mm after the beating treatment and the time for the beating treatment is 6 hours. Separator paper for an alkali battery having a thickness of 28.8 µm, a gas tightness of 295 minutes/100 ml, and an area shrinkage rate of 0.2% is obtained by making paper from the beaten alkali treated pulp by the Fourdrinier paper machine.

Embodiment 10

Non-bleached sisal hemp pulp is immersed in NaOH aqueous solution having the concentration of 14 weight %. A procedure similar to that of the embodiment 1 is used in order to obtain alkali treated pulp (the ratio of cellulose 2 is 58%, the degree of polymerization is 1550, and the brightness is 59%) of 500 kg that has a crystalline structure in which the cellulose 1 and the cellulose 2 coexist. After breaking the alkali treated pulp of 500 kg in water in order to obtain a pulp slurry, the pulp slurry is subjected to the beating treatment until the CSF value becomes 0 ml by using the double disk refiner (DDR), in order to fibrillate the fibers. The average fiber length is 0.38 mm after the beating treatment and the time for the beating treatment is 6 hours. Hot water soluble polyvinyl alcohol fibers (the fiber diameter is 1.1 decitex and the fiber length is 3 mm) of 20 kg are added to the beaten alkali treated pulps and sufficient mixing is carried out in order to obtain a raw material for making paper. The content of cellulose fibers is 96.2 weight % in relation to the raw material for making paper. Separator paper for an alkali battery having a thickness of 39.5 µm, a gas tightness of 630 minutes/100 ml, and an area shrinkage rate of 1.5% is obtained by making paper from the raw material by using the Fourdrinier paper machine.

Manufacture of the separator papers for alkaline batteries is carried out according to comparison examples and conventional examples, in order to confirm the effects of the separator paper for alkaline battery according to the present invention.

COMPARISON EXAMPLE 1

Non-bleached coniferous tree pulp is immersed in NaOH aqueous solution having the concentration of 25 weight %. A procedure similar to that used in the embodiment 1 is used in order to obtain alkali treated pulp (the ratio of cellulose 2 is 100%, the degree of polymerization is 1300, and the brightness is 54%) of 500 kg that has a crystalline structure of cellulose 2. After breaking the alkali treated pulp in water in order to obtain a pulp slurry, the pulp slurry is subjected to the beating treatment until the CSF value becomes 2 ml by using the double disk refiner (DDR), in order to fibrillate the fibers. The average fiber length is 0.15 mm after the beating treatment and the time for the beating treatment is 15 hours. Separator paper for an alkali battery having a thickness of 40.0 µm, a gas tightness of 3 minutes/100 ml, and an area shrinkage rate of 0.2% is obtained by making paper from the raw material by using the Fourdrinier paper machine.

COMPARISON EXAMPLE 2

Bleached coniferous tree pulp is immersed in NaOH aqueous solution having the concentration of 18 weight %. A procedure similar to that used in the embodiment 1 is used in order to obtain alkali treated pulp (the ratio of cellulose 2 is 98%, the degree of polymerization is 1020, and the brightness is 74%) of 500 kg that has an approximate crystalline structure of cellulose 2. After breaking the alkali treated pulp in water in order to obtain a pulp slurry, the pulp slurry is subjected to the beating treatment until the CSF value becomes 1 ml by using the double disk refiner (DDR), in order to fibrillate the fibers. The average fiber length is 0.18 mm after the beating treatment and the time for the beating treatment is 13 hours. Separator paper for an alkali battery having a thickness of 31.0 µm, a gas tightness of 4 minutes/100 ml, and an area shrinkage rate of 0.1% is obtained by making paper from the raw material by using the Fourdrinier paper machine.

COMPARISON EXAMPLE 3

Bleached coniferous tree pulp is immersed in NaOH aqueous solution having the concentration of 5 weight %. A procedure similar to that of the embodiment 1 is used in order to obtain alkali treated pulp (the ratio of cellulose 2 is 0%, the degree of polymerization is 1080, and the brightness is 72%) of 500 kg that has a crystalline structure of cellulose 1. After breaking the alkali treated pulp in water in order to obtain a pulp slurry, the pulp slurry is subjected to the beating treatment until the CSF value becomes 0 ml by using the double disk refiner (DDR), in order to fibrillate the fibers. The average fiber length is 0.40 mm after the beating treatment and the time for the beating treatment is 5 hours. Separator paper for an alkali battery having a thickness of 30.3 μm, a gas tightness of 445 minutes/100 ml, and an area shrinkage rate of 9.3% is obtained by making paper from the raw material by using the Fourdrinier paper machine.

COMPARISON EXAMPLE 4

Bleached coniferous tree pulp is immersed in NaOH aqueous solution having the concentration of 15 weight %. A procedure similar to that of the embodiment 1 is used in order to obtain alkali treated pulp (the ratio of cellulose 2 is 77%, the degree of polymerization is 1080, and the brightness is 74%) of 500 kg that has a crystalline structure in which the cellulose 1 and the cellulose 2 coexist. After breaking the alkali treated pulp in water in order to obtain a pulp slurry, the pulp slurry is subjected to the beating treatment until the CSF value becomes 70 ml by using the double disk refiner (DDR), in order to fibrillate the fibers. The average fiber length is 0.62 mm after the beating treatment and the time for the beating treatment is 5 hours. Separator paper for alkali battery having a thickness of 30.8 μm, a gas tightness of 0.1 minutes/100 ml, and an area shrinkage rate of 2.3% is obtained by making paper from the raw material by using the Fourdrinier paper machine.

COMPARISON EXAMPLE 5

Available cellophane (P-5#500 made by Futamura Chemical Co., Ltd.) of 35.1 μm is used as the separator paper for alkaline battery. The separator paper for the alkaline battery has a thickness of 35.1 μm, a gas tightness of 5000 minutes/100 ml, and an area shrinkage rate of 1.4%.

CONVENTIONAL EXAMPLE 1

Solvent spun rayon fiber (1.7 decitex, fiber length: 2 mm, and degree of polymerization: 520) of 100 kg is subjected to the beating treatment until the CSF value becomes 150 ml. The average fiber length is 1.25 mm after the beating treatment. Vinylon fiber (formalized P.V.A. fiber, 0.6 decitex, fiber length: 2 mm) of 70 kg and hot water soluble polyvinyl alcohol fiber (1.1 decitex, fiber length: 3 mm) of 30 kg are added to the beaten fiber and mixture is carried out in order to obtain a raw material for making paper. The content of cellulose fibers is 50 weight % in relation to the raw material for making paper. Separator paper for an alkaline battery having a thickness of 75.6 μm, a gas tightness of 0.02 minutes/100 ml, and an area shrinkage rate of 1.9% is obtained by making paper from the raw material by using a cylinder paper machine.

CONVENTIONAL EXAMPLE 2

Bleached coniferous tree pulp is immersed in NaOH aqueous solution having the concentration of 18 weight %. A procedure similar to that used in the embodiment 1 is used in order to obtain alkali treated pulp (the ratio of cellulose 2 is 98%, the degree of polymerization is 830, and the brightness is 77%) of 100 kg. The alkali treated pulp is subjected to the beating treatment until the CSF value becomes 300 ml by using the double disk refiner (DDR), in order to fibrillate the fibers. The average fiber length is 0.61 mm after the beating treatment. Vinylon fiber (0.6 decitex, fiber length: 2 mm) of 70 kg and hot water soluble polyvinyl alcohol fiber (1.1 decitex, fiber length: 3 mm) of 30 kg are added to the beaten alkali treated pulp and mixing is carried out in order to obtain a raw material for making paper. The content of cellulose fibers is 50 weight % in relation to the raw material for making paper. Separator paper for an alkaline battery having a thickness of 100.7 μm, a gas tightness of 0.01 minutes/100 ml, and an area shrinkage rate of 1.2% is obtained by making paper from the raw material by using the cylinder paper machine.

TABLE 2

| embodiment number | thickness (μm) | basis weight (g/m$^2$) | density (g/m$^3$) | tensile strength (N/15 mm) | Liquid impregnate amount (g/m$_2$) | gas tightness (minutes/-100 ml) | electric resistance mΩ |
|---|---|---|---|---|---|---|---|
| embodiment | | | | | | | |
| 1-1 | 17.2 | 9.4 | 0.547 | 11 | 54 | 168 | 6.1 |
| 1-2 | 30.6 | 18.7 | 0.611 | 24 | 96 | 305 | 9.7 |
| 1-3 | 40.7 | 26.7 | 0.656 | 42 | 113 | 432 | 12.6 |
| 1-4 | 55.3 | 41.8 | 0.756 | 79 | 152 | 710 | 16.7 |
| embodiment | | | | | | | |
| 2-1 | 30.2 | 15.5 | 0.513 | 17 | 89 | 65 | 7.9 |
| 2-2 | 39.5 | 21.6 | 0.547 | 26 | 101 | 98 | 9.9 |
| 2-3 | 59.2 | 35.7 | 0.603 | 49 | 144 | 192 | 13.2 |
| embodiment | | | | | | | |
| 3-1 | 30.5 | 20.5 | 0.672 | 28 | 10 | 396 | 11.1 |
| 3-2 | 30.0 | 19.9 | 0.663 | 25 | 99 | 372 | 10.6 |
| 3-3 | 30.2 | 19.5 | 0.646 | 24 | 97 | 358 | 9.9 |
| 3-4 | 30.1 | 18.8 | 0.625 | 24 | 96 | 324 | 9.8 |
| 3-5 | 30.3 | 18.2 | 0.601 | 23 | 98 | 250 | 9.7 |
| 3-6 | 30.4 | 16.8 | 0.553 | 20 | 103 | 120 | 9.4 |
| 3-7 | 30.5 | 15.9 | 0.521 | 13 | 108 | 11 | 9.0 |
| embodiment 4 | 57.2 | 33.4 | 0.584 | 31 | 153 | 25 | 14.6 |
| embodiment 5 | 50.5 | 28.2 | 0.558 | 27 | 127 | 136 | 12.1 |
| embodiment 6 | 40.7 | 21.4 | 0.526 | 25 | 138 | 29 | 10.2 |
| embodiment 7 | 30.3 | 17.6 | 0.581 | 24 | 105 | 228 | 8.9 |
| embodiment 8 | 40.0 | 27.2 | 0.680 | 41 | 118 | 520 | 12.8 |

TABLE 2-continued

| embodiment number | thickness (μm) | basis weight (g/m$^2$) | density (g/m$^3$) | tensile strength (N/15 mm) | Liquid impregnate amount (g/m$_2$) | gas tightness (minutes/−100 ml) | electric resistance mΩ |
|---|---|---|---|---|---|---|---|
| embodiment 9 | 28.8 | 17.1 | 0.594 | 22 | 105 | 295 | 9.3 |
| embodiment 10 | 39.5 | 27.5 | 0.696 | 59 | 81 | 630 | 19.3 |
| comparison example 1 | 40.0 | 20.8 | 0.520 | 12 | 135 | 3 | 11.5 |
| comparison example 2 | 31.0 | 15.3 | 0.494 | 9 | 108 | 4 | 8.8 |
| comparison example 3 | 30.3 | 21.6 | 0.713 | 39 | 102 | 445 | 12.2 |
| comparison example 4 | 30.8 | 16.0 | 0.519 | 22 | 105 | 0.1 | 8.3 |
| comparison example 5 | 35.1 | 46.8 | 1.333 | 77 | 118 | ≧5000 | 38.6 |
| conventional example 1 | 75.6 | 26.4 | 0.349 | 25 | 145 | 0.02 | 9.8 |
| conventional example 2 | 100.7 | 37.5 | 0.372 | 47 | 173 | 0.01 | 18.6 |

TABLE 3

| embodiment number | NaOH Concentration | ratio of cellulose 2 | degree of polymerization | Brightness (%) | CSF (ml) | fiber length (mm) | content of cellulose (%) | Beating time (hr) | Alkali proof (%) weight reduction rate | Alkali proof (%) Area shrinkage rate |
|---|---|---|---|---|---|---|---|---|---|---|
| embodiment 1-1 | 15 | 75 | 1350 | 53 | 0 | 0.30 | 100 | 6.0 | 4.4 | 0.3 |
| 1-2 | | | | | | | | | 4.4 | 0.3 |
| 1-3 | | | | | | | | | 4.3 | 0.2 |
| 1-4 | | | | | | | | | 4.2 | 0.2 |
| embodiment 2-1 | 14 | 60 | 1100 | 76 | 0 | 0.35 | 90.6 | 7.0 | 4.9 | 0.2 |
| 2-2 | | | | | | | | | 4.8 | 0.2 |
| 2-3 | | | | | | | | | 4.8 | 0.2 |
| embodiment 3-1 | 10 | 22 | 1460 | 50 | 0 | 0.38 | 100 | 5.0 | 5.3 | 3.5 |
| 3-2 | 11 | 32 | 1450 | 50 | 0 | 0.37 | 100 | 6.0 | 5.0 | 2.3 |
| 3-3 | 11.5 | 43 | 1400 | 51 | 0 | 0.35 | 100 | 6.0 | 4.8 | 1.2 |
| 3-4 | 12.5 | 52 | 1380 | 52 | 0 | 0.33 | 100 | 6.0 | 4.6 | 0.3 |
| 3-5 | 15.5 | 83 | 1350 | 55 | 0 | 0.30 | 100 | 7.0 | 4.3 | 0.2 |
| 3-6 | 16 | 88 | 1340 | 55 | 0 | 0.23 | 100 | 8.0 | 4.2 | 0.2 |
| 3-7 | 17 | 93 | 1340 | 58 | 0 | 0.19 | 100 | 10.0 | 4.0 | 0.2 |
| embodiment 4 | 11.5 | 38 | 1050 | 72 | 30 | 0.50 | 85.5 | 4.5 | 3.6 | 0.9 |
| embodiment 5 | 15 | 78 | 1750 | 76 | 3 | 0.38 | 90.9 | 6.0 | 3.5 | 0.3 |
| embodiment 6 | 13 | 58 | 1350 | 56 | 0 | 0.25 | 100 | | 4.9 | 0.5 |
| embodiment 7 | 12.3 | 55(66.3) | 1450 | 56 | 1 | | | 7.0 | | |
| | 21 | 100 | 950 | 77 | | 0.28 | 100 | | 4.2 | 0.2 |
| embodiment 8 | 16 | 85(59.5) | 1330 | 57 | 0 | | | 6.0 | | |
| | 5 | 0 | 1400 | 59 | | 0.38 | 100 | | 4.3 | 0.8 |
| embodiment 9 | 16 | 80 | 610 | 79 | 0 | 0.26 | 100 | 6.0 | 7.3 | 0.2 |
| embodiment 10 | 14 | 58 | 1550 | 59 | 0 | 0.38 | 96.2 | 6.0 | 6.1 | 1.5 |
| comparison example 1 | 25 | 100 | 1300 | 54 | 2 | 0.15 | 100 | 15.0 | 4.0 | 0.2 |
| comparison example 2 | 18 | 98 | 1020 | 74 | 1 | 0.18 | 100 | 13.0 | 4.1 | 0.1 |
| comparison example 3 | 5 | 0 | 1080 | 72 | 0 | 0.40 | 100 | 5.0 | 5.6 | 9.3 |
| comparison example 4 | 15 | 77 | 1080 | 74 | 70 | 0.62 | 100 | 5.0 | 4.7 | 2.3 |
| comparison example 5 | — | — | — | — | — | — | 100 | — | 4.9 | 1.4 |

TABLE 3-continued

| embodiment number | NaOH Concentration | ratio of cellulose 2 | degree of polymerization | Brightness (%) | CSF (ml) | fiber length (mm) | content of cellulose (%) | Beating time (hr) | Alkali proof (%) weight reduction rate | Alkali proof (%) Area shrinkage rate |
|---|---|---|---|---|---|---|---|---|---|---|
| conventional example 1 | — | — | 520 | — | 150 | 1.25 | 50 | — | 3.8 | 1.9 |
| conventional example 2 | 18 | 98 | 830 | 77 | 300 | 0.61 | 50 | — | 2.8 | 1.2 |

Each of the measured values is measured by the following methods for each separator paper with respect to each of the embodiments, the comparison examples, and the conventional examples.

(1. Estimating Method of the Pulp or the Chemical Fiber)

(1) CSF (Canadian Standard Freeness)

Measurement is carried out in the method of Canadian Standard described in JIS P 8121.

(2) Alkali Proof (Area Shrinkage Rate)

On measuring the shrinkage of the pulp or the chemical fiber, the hot water soluble polyvinyl alcohol fiber of 10% in weight percent is mixed to the sample and a sheet made by hands (hand made sheet) of 30 g/m² is manufactured in weighing capacity. A predetermined size sample is cut off from the sheet and the area is measured in the predetermined size sample. Next, the predetermined size sample is immersed in 40% KOH aqueous solution of 70° C. during 8 hours. The area of immersed sample is measured in the condition that the immersed sample be drenched by the electrolytic solution and the area shrinkage rate is calculated in accordance with the following equation.

Area shrinkage rate (%)=($A1-A2$)/$A1 \times 100$ where A1: the area before immersing,
A2: the area after immersing (3) Alkali Proof (Weight Reduction Rate)

On measuring the weight reduction rate of the pulp or the chemical fiber, the sample is sufficiently washed with water in advance. The sample of 1.5 g from that fine fibers are removed is dried at temperature of 80° C. and the weight of sample is measured. After the sample is immersed in 40% KOH aqueous solution of 70° C. during 8 hours, the sample is washed with an amount of water and the sample is dried at the temperature of 80° C. The weight of dried sample is again measured and the weight reduction rate is calculated in accordance with the following equation.

Weight reduction rate (%)=($W1-W2$)/$W1 \times 100$ where W1: the weight before immersing, W2: the weight after immersing (4) Degree of Polymerization The degree of polymerization is measured on the basis of the method of measuring the degree of polymerization that is described in JIS L 1015. Ubbelohde type viscosity meter is used as a viscosity meter. In the testing method, the pulp or the regenerated cellulose fiber of 50 mg is taken as a sample in a container having air tightness, in dried condition. Cuprammonium solution of 50 ml is correctly added in the container and is stirred together with the sample, in order to perfectly dissolve the fibers of sample in cuprammonium solution. The solution is transferred to the viscosity meter and the temperature is adjusted to 20±0.05° C. in a water bath. Measurement is carried out with respect to a dropping time of solution and the degree of polymerization is calculated in accordance with equivalent or conversion equation.

(5) Brightness

The brightness is measured in accordance with a method of ISO brightness that is described in JIS P 8148.

(6) Average Fiber Length

Number average fiber length (Ln) is measured as the average fiber length by using Kajaani FiberLab of Valmet Automation Kajaani Co. Ltd.

(2. Estimating Method of the Separator Paper)

(1) Thickness

Ten separator papers are laminated into a laminated sample. The thickness of the laminated sample is measured at each of several measuring points which are positioned at a predetermined interval, using an outside micrometer (spindle diameter: 6.35 mm, measuring length: ≦25 mm, and the micrometer measuring force is 4.9±0.49N). The thickness is calculated on the basis of 1/10 of the measured result in each of the several measuring points and the average value is calculated as the thickness of separator paper with respect to the obtained thicknesses of several measuring points.

(2) Basis Weight

The separator paper having an area which is not less than 1.01 m² is dried as a sample at the temperature of 105° C. until the weight of sample becomes a predetermined weight. The weight of separator paper per 1 m² is calculated in accordance with the weight of sample.

(3) Tensile Strength

The tensile strength of separator paper is measured with respect to a machine direction of sample in accordance with a method which is described in JIS P 8113.

(4) Gas Tightness

On measuring the gas tightness of separator paper, the separator paper is held on a lower test piece attaching portion (internal hole whose area is 645.16 mm²) of B type measuring device defined by JIS P 8117 (a method of testing air permeability of paper and paper board). Measurement is carried out with respect to the time duration (minute/100 ml) during which air passes through the area of 645.16 m² in the separator paper.

(5) Liquid Impregnate Amount

A square sheet of 50 mm×50 mm is cut off from the separator paper, dried and measured for its weight. The square sheet is immersed into 40% KOH aqueous solution for 10 minutes. The test piece is stretched onto an inclined glass plate, at 45 degrees and held in this state for three minutes. The excessive KOH solution is removed and provided to the measurement of the weight of the test piece, and the impregnate amount is calculated in accordance with the following equation.

Liquid impregnate amount (g/m²)=($W2-W1$)

where W1=weight before immersing, W2=weight after immersing.

(6) Alkali Proof (Area Shrinkage Rate)

A square sheet of 200 mm×200 mm is accurately cut off from the separator paper. After the square sheet is immersed into 40% KOH aqueous solution of 70° C. during 8 hours, the vertical and the longitudinal lengths of the square sheet is accurately measured and the area shrinkage rate is calculated in accordance with the following equation.

Area shrinkage rate (%)=$(A1-A2)/A1 \times 100$ where A1: the area before immersing,
A2: the area after immersing (7) Alkali Proof (Weight Reduction Rate)

The separator paper of 1.5 g is dried as a sample at temperature of 80° C. and the weight of sample is measured. After the sample is immersed in 40% KOH aqueous solution of 70° C. during 8 hours, the sample is washed with an amount of water and the sample is dried at the temperature of 80° C. The weight of dried sample is again measured and the weight reduction rate is calculated in accordance with the following equation.

Weight reduction rate (%)=$(W1-W2)/W1 \times 100$ where W1: the weight before immersing,
W2: the weight after immersing (8) Electric Resistance One separator paper is inserted between platinum electrodes (circular plate shaped electrodes of 20 mm diameter having platinum black) which are positioned in parallel at about 2.5 mm interval and which are immersed in 40% KOH aqueous solution. The increase of electric resistance between the electrodes based on the above-mentioned insertion is measured as the electric resistance of separator paper. Incidentally, the electric resistance between the electrodes is measured in a frequency of 1000 Hz by an ESR meter.

The separator papers of the above-mentioned embodiments have the thicknesses between 17.2 μm (embodiment 1-1) and 59.2 μm (embodiment 2-3) and the gas tightness between 11 minutes/100 ml (embodiment 3-7) and 710 minutes/100 ml (embodiment 1-4). Each of the separator papers is thin, hardly deteriorates against the positive electrode active material of the battery, and has the high gas tightness degree. Furthermore, each of the separator papers has the high shortage preventing effect for the alkaline battery. As a result, it is possible to obtain an alkaline battery having a high electric capacity and a high rate discharge property while increasing the amount of active materials in the battery in comparison to the prior art, when using the obtained separator paper in the thickness which is not greater than 120 μm.

In the embodiment 1-2, the embodiments 3-1 to 3-7, the embodiment 9, the comparison example 2, and the comparison example 3, the coniferous tree pulps are subjected to the alkali treatment in NaOH aqueous solution having a sort of concentrations. Using the raw materials which are beaten into CSF=0 ml and CSF=1 ml, respectively, the raw materials are made into the separator papers each of which has the thickness of about 30 μm. Because comparison is easy, the comparative examination is made as regards the physical data of separator papers according to the present invention in accordance with the above-mentioned separator papers. At first, the ratio of cellulose 2 of the alkali treated pulp increases from 0% to 98% in which the alkali treated pulp has the approximate crystalline structure of cellulose 2, as the NaOH concentration of alkali treatment increases from 5 weight % of the comparison example 3 to 18 weight % of the comparison example 2. In the embodiments 3-1 to 3-7 in which NaOH concentrations are between 10 weight % and 17 weight %, the ratio of cellulose 2 increases from 22% to 93%.

Although the time durations of beating treatment are between 5 hours and 7 hours for the comparison example 3 and the embodiments 3-1 to 3-5, the beating treatment takes 8 hours, 10 hours, and 13 hours in the embodiment 3-6, the embodiment 3-7, and the comparison example 2 in which NaOH concentrations increase, respectively. It is noted that it takes a very long time duration to beat the alkali treated pulp of embodiment 3-6 in which the ratio of cellulose 2 is not less than 88%. Inasmuch as the fibril components are strongly connected in the pulp fibers as the ratio of cellulose 2 increases, it is difficult to produce the fibrils by the beating treatment. Furthermore, it takes a very long time duration in the beating treatment, inasmuch as the produced fibrils are easily cut off. Although the average fiber length after beating is 0.40 mm in the comparison example 3 in which the ratio of cellulose 2 is 0%, the average fiber length becomes short as the ratio of cellulose 2 increases. The average fiber lengths are between 0.38 mm and 0.30 mm in the embodiments 3-1 to 3-5. The average fiber length is 0.2 mm in the embodiment 3-6. The average fiber length is 0.19 mm in the embodiment 3-7. The average fiber length is 0.18 mm in the comparison example 2 in which the ratio of cellulose 2 is 98%. As described above, the fibrils are strongly connected to one another in the pulp fibers as the ratio of cellulose 2 increases. It is noted that it takes a long time duration to carry out the beating treatment and the average fiber length after beating rapidly becomes short, inasmuch as the connection becomes strong in the alkali treated pulp having the ratio of cellulose 2 which is not less than about 88% as shown in the embodiment 3-6. As a result, the beating time duration becomes 13 hours and the fiber length becomes 0.18 mm in the comparison example 2 whose ratio of cellulose 2 is 98%. Furthermore, the beating time duration becomes 15 hours and the fiber length becomes 0.15 mm in the comparison example 1 whose ratio of cellulose 2 is 100%.

It is conceivable that the crystal part of fine cellulose 1, the crystal part of cellulose 2, and other amorphous parts dispersively exist in a single fiber of pulp, in the pulp which is treated by NaOH aqueous solution and which has the cellulose 1 and the cellulose 2. The cellulose 1 has the property in which the cellulose 1 is easily fibrillated. The beating treatment becomes difficult when the ratio of cellulose 2 is not less than 88%. It is conceivable that the cellulose 1 dispersed in the single fiber of pulp is fibrillated and the fiber length becomes short, on fibrillating the alkali treated pulp. It is desirable as a minimum that the crystal part of cellulose 1 of about 10% disperses in the crystal part of fine cellulose 2, in order to carry out good fibrillation.

The ratio of cellulose 2 remarkably affects the gas tightness and the area reduction rate, each of which is the standard of shielding of the separator paper. Although the separator paper has the gas tightness of 445 minutes/100 ml in the comparison example 3 which uses the pulp whose ratio of cellulose 2 is 0%, the gas tightness gradually reduces in the embodiments 3-1 to 3-5 as the ratios of cellulose 2 increase. Although the embodiment 3-5 whose ratio of cellulose 2 is 83% has the gas tightness of 250 minutes/100 ml, the gas tightness rapidly reduce as 120 minutes/100 ml (embodiment 3-6), 11 minutes/100 ml (embodiment 3-7), and 4 minutes/100 ml (comparison example 2), as the ratios of cellulose 2 further increase. Although the ratio of cellulose 2 is 93% in the embodiment 3-7, it is conceivable that the pinholes have occurred when the gas tightness is not greater than about 10 minutes/100 ml as each of the embodiment 3-7 and the comparison example 2.

Highly fibrillated pulp fibers are strongly connected to one another by self-connecting function based on hydrogen bond between cellulose hydroxyl groups in the separator paper according to each of the present embodiments. Therefore, the density of separator paper (assumed density value obtained by basis weight $(g/m^2)$÷thickness $(\mu m)$) is between 0.51 $g/m^3$ and 0.76 $g/m^3$ and the separator paper has an appearance like a film. The density of separator paper varies in accordance with the content of the alkali treated pulp and the beating rate. When the content of the alkali treated pulp is large and the beating rate is large, the density becomes large in the separator paper. In addition, the gas tightness which is index of the shortage preventing effect becomes large in the separator paper together with the density when the pinholes do not occur. There is effect in which the shortage is prevented in the battery.

Although the density, the tensile strength, and the electric resistance do not greatly vary in comparison to the gas tightness, it is noted that the property values reduce in the density, the tensile strength, and the electric resistance, respectively, as the ratio of cellulose 2 increases. When confirming the property values with respect to the comparison example 3, the embodiments 3-1 to 3-7, and the comparison example 2, the densities of separator papers reduce from 0.713 $g/m^3$ to 0.494 $g/m^3$ in case where the ratios of cellulose 2 increase from 0% to 98%. In addition, the tensile strengths of separator papers reduce from 39 N/15 mm to 9 N/15 mm. Furthermore, the electric resistances of separator papers reduce from 12.2 mΩ to 8.8 mΩ.

As described above, the gas tightness, the density, and the tensile strength reduce as the ratio of cellulose 2 increases. It is conceivable that the hydrogen bond between the fibrillated fibers reduces which form the separator paper, although it is relative that the average fiber length after beating becomes short. It is conceivable that the property of each fibril produced by beating is changed to property which is difficult to be connected by hydrogen bond, as the ratio of cellulose 2 increases. Incidentally, the gas tightness, the density, and the tensile strength reduce, as well as these properties reduce in case where the chemical fibers are added in the separator paper (comparing with the embodiment 2-1). In addition, these properties increase inasmuch as the hot water soluble PVA fibers are added in the separator paper and the fibers of separator paper are connected by PVA in the embodiment 10. On the other hand, the area shrinkage increases in the embodiment 10 inasmuch as the fibers are connected by PVA too.

Therefore, the property value of gas tightness becomes large and there is effect in the shielding is added to the separator paper, when the ratio of cellulose 2 is small. On the contrary, the area shrinkage rate (alkali proof) becomes 9.3% in the separator paper using the pulp whose ratio of cellulose 2 is 0% as shown in the comparison example 3. The alkali proof is less than the gas tightness. As the ratio of cellulose 2 increases, the area shrinkage rates becomes 3.5% (embodiment 3-1), 2.3% (embodiment 3-2), and 1.2% (embodiment 3-1), respectively. Furthermore, the area shrinkage rates become 0.3% to 0.1% in the embodiments 3-4 to 3-7 and the comparison example 2, respectively. Each of the separator papers has high area shrinkage rate (alkali proof) downward the embodiment 3-4 whose ratio of cellulose 2 is not less than 52%.

When the shrinkage of separator paper is large in relation to the alkali electrolyte in the alkaline battery such as LR6, a gap occurs between a cylindrical separator and a packing. The cylindrical separator is formed by rolling the separator paper and is installed in the battery. The packing is for use in holding an upper part of the cylindrical separator. When the gap occurs in the cylindrical separator, a negative electrode gel filled in the cylindrical separator leaks from the gap. As a result, the negative electrode gel is contact with the positive electrode and the shortage occurs. Under the circumstances, it is required to reduce the area shrinkage rate (alkali proof) of separator paper in the alkaline battery. The area shrinkage rate (alkali proof) is about 2% in the used separator paper as readily understood from conventional examples 1 and 2. There is not a practical problem in case where the area shrinkage rate is preferably less than 2%. Therefore, The ratio of cellulose 2 is appropriate between 40% and 90% on the basis of variations of the gas tightness and the area shrinkage rate (alkali proof). More particularly, it is preferable to select the ratio of cellulose 2 between 50% and 85%.

The beating degree is a range between CSF 0 ml and CSF 30 ml in the alkali treated pulp which is used in the separator paper according to each embodiment of the present invention. As a result, the gas tightness is controlled in a range between 11 minutes/100 ml and 710 minutes/100 ml. On the other hand, the gas tightness greatly reduces to 0.1 minutes/100 ml although the bleached coniferous tree pulp is beaten till CSF 70 ml in the comparison example 4. As described above, the gas tightness greatly reduces in the separator paper whose CSF is greater than 50 ml. In case where such a separator paper is used in the battery, the shortage may often occur.

In each of the embodiments 1-1 to 1-4, non bleached coniferous tree pulps are subjected to the alkali treatment and are beaten into the raw materials each of which has CSF of 0 ml. Using the raw materials, the separator paper is made which has the thicknesses between 17.2 μm and 55.3 μm. As the thickness increases, it is noted that the density, the gas tightness, the tensile strength, and the electric resistance increase in the separator paper. In the embodiments 2-1 to 2-3, bleached Manila hemp pulps are subjected to the alkali treatment and are beaten into the raw materials each of which has CSF of 0 ml. The chemical fibers (heat treated vinylon fibers) of 10% are mixed to the raw materials in order to obtain the separator papers. When comparing the embodiments 1-1 to 1-4 with the embodiments 2-1 to 2-3, each of the embodiments 2-1 to 2-3 has density, the gas tightness, the tensile strength, and the electric resistance which are less than those of each of the embodiments 1-1 to 1-4, inasmuch as the connection between the fibers based on the hydrogen bond becomes weak in the separator paper by mixing of chemical fibers. The gas tightness rapidly reduces when the amount of chemical fibers further increases. Inasmuch as the shielding reduces in the separator paper, it is necessary to make the amount of chemical fibers be the range between 0 weight % and 20 weight % in the present invention.

When the fiber length is less than the average fiber length of 0.2 mm as readily understood from variation of gas tightness of the separator paper in each of the comparison example 3, the embodiments 3-1 to 3-7, and the comparison example 2, the fibers flow out of the wire cloth of paper making machine and the gas tightness rapidly reduces in the separator paper. In addition, the separator paper has a low gas tightness of 0.1 minutes/100 ml in the comparison example 4, although CSF is 70 ml and the average fiber length is 0.62 mm in the comparison example. It is preferable that the average fiber length is between 0.2 mm and 0.6 mm. More specifically, it is preferable that the average fiber length is between 0.25 mm and 0.5 mm.

In the embodiment 9, bleached coniferous tree pulp is subjected to the alkali treatment and is exposed to air, in order to obtain the pulp having a low degree of polymerization of 610. This pulp is beaten into the raw material having CSF of 0 ml. The raw material is processed into the separator paper.

When comparing the embodiment 9 with the embodiment 1-2, the embodiment 3-5, the comparison example 2, and the comparison example 3, the weight reduction rate (alkali proof) is 7.3% and the embodiment 9 has the largest weight reduction rate (alkali proof). This means that the soluble components increase which is dissolved in the alkali electrolyte, because of the reduction of degree of polymerization.

Using each of the above-mentioned separator papers, alkaline manganese batteries (LR6) are manufactured each of which has an inside-out structure. Each of the alkaline manganese batteries is subjected to a discharge test in which measurement is carried out with respect to a time duration until the voltage drops to a final voltage of 0.9V, under a load of $2\Omega$. Namely, each of the alkaline manganese batteries is connected to the resistor of $2\Omega$ and the time duration is measured until the voltage drops to 0.9V in the battery. Each of the alkaline manganese batteries is subjected to a discharge test in which measurement is carried out with respect to a time duration until the voltage drops to a final voltage of 0.9V, under a load of $100\Omega$. Furthermore, each of the alkaline manganese batteries is subjected to an intermittent discharge test in which discharge is carried out during 5 minutes/day under a load of $3.9\Omega$ and the voltage is measured after 50 days. Table 4 gives results based on the above-mentioned tests.

TABLE 4 battery test result

| | Separator paper | | | | | discharge test result | |
|---|---|---|---|---|---|---|---|
| | physical value | | | | | | |
| category | thickness (μm) | gas tightness (minutes/100 ml) | area shrinkage rate (%) (alkali proof) | The number of winding (time) | $2\Omega$ discharge (minutes) | $100\Omega$ discharge (hours) | intermittent discharge (V) |
| embodiment | | | | | | | |
| 1-1 | 17.2 | 168 | 0.3 | 1 | 155 | 248 | 1.1 |
| 1-2 | 30.6 | 305 | 0.3 | 1 | 148 | 243 | 1.2 |
| 1-3 | 40.7 | 432 | 0.2 | 1 | 145 | 238 | 1.2 |
| 1-4 | 55.3 | 710 | 0.2 | 1 | 140 | 230 | 1.2 |
| embodiment | | | | | | | |
| 2-1 | 30.2 | 65 | 0.2 | 2 | 143 | 230 | 1.2 |
| 2-2 | 39.5 | 98 | 0.2 | 1 | 148 | 236 | 1.2 |
| 2-3 | 59.2 | 192 | 0.2 | 1 | 141 | 229 | 1.2 |
| embodiment | | | | | | | |
| 3-1 | 30.5 | 396 | 3.5 | 1 | 143 | 241 | 1.1 |
| 3-2 | 30.0 | 372 | 2.3 | 1 | 145 | 243 | 1.2 |
| 3-3 | 30.2 | 358 | 1.2 | 1 | 147 | 243 | 1.2 |
| 3-4 | 30.1 | 324 | 0.3 | 1 | 147 | 242 | 1.2 |
| 3-5 | 30.3 | 250 | 0.2 | 1 | 148 | 243 | 1.2 |
| 3-6 | 30.4 | 120 | 0.2 | 1 | 149 | 240 | 1.0 |
| 3-7 | 30.5 | 11 | 0.2 | 1 | 149 | 238 | 0.8 |
| embodiment 4 | 57.2 | 25 | 0.9 | 1 | 141 | 232 | 1.2 |
| embodiment 5 | 50.5 | 136 | 0.3 | 1 | 144 | 235 | 1.2 |
| embodiment 6 | 40.7 | 29 | 0.5 | 2 | 139 | 230 | 1.2 |
| embodiment 7 | 30.3 | 228 | 0.2 | 1 | 150 | 240 | 1.2 |
| embodiment 8 | 40.0 | 520 | 0.8 | 1 | 145 | 235 | 1.2 |
| embodiment 9 | 28.8 | 295 | 0.2 | 1 | 148 | 238 | 0.8 |
| embodiment 9 | | | | 2 | 140 | 230 | 1.2 |
| embodiment 10 | 39.5 | 630 | 1.5 | 1 | 140 | 230 | 1.2 |
| comparison example 1 | 40.0 | 3 | 0.2 | 1 | 148 | 233 | 0.5 |
| comparison example 2 | 31.0 | 4 | 0.1 | 1 | 150 | 230 | 0.5 |
| comparison example 3 | 30.3 | 445 | 9.3 | 1 | shortage | shortage | shortage |
| comparison example 4 | 30.8 | 0.1 | 2.3 | 1 | 150 | 239 | 0.3 |
| comparison example 5 | 35.1 | ≧5000 | 1.4 | 1 | 96 | 212 | 1.2 |
| conventional example 1 | 75.6 | 0.02 | 1.9 | 1 | 146 | 231 | 0.3 |
| conventional example 1 | | | | 4 | 131 | 211 | 0.9 |
| conventional example 2 | 100.7 | 0.01 | 1.2 | 1 | 142 | 229 | 0.2 |
| conventional example 2 | | | | 3 | 130 | 210 | 0.7 |

On manufacturing the batteries, the amounts of the positive electrode active materials, the negative electrode active materials, and the electrolyte are adjusted to be filled in the each of batteries in agreement with the thickness of separator paper, in the continuous discharge tests of 2Ω and 100Ω. On the other hand, the amounts of the positive electrode active materials, the negative electrode active materials, and the electrolyte are adjusted to same amounts, respectively, in order to manufacture the batteries, in the intermittent discharge test of 3.9Ω. On sealing the bottom portion of separator paper which is rolled into a cylindrical shape, the bottom portion of separator paper cylinder is sealed by thermal fusion in the separator paper of each of the embodiments 2-1, 2-2, 2-3, 5, and 10. In the separator paper of each of the other embodiments, a coessential separator paper is shaped into a cup shaped separator paper and the above-mentioned separator paper cylinder is engaged into the cup shaped separator paper. Incidentally, the portion be bonded is moistened by water on thermally bonding the bottom portion of separator paper cylinder obtained from the separator paper of each of the embodiments 2-1, 2-2, 2-3, 5, and 10. The bottom portion of separator paper cylinder is pinched at its both sides by heated metal bars and is pressed by the heated metal bars, in order to bond the bottom portion. The bonding strength becomes strong when the portion be bonded is moistened by water in advance. In addition, the inhibiter is not added which is for preventing the growth of zinc oxide dendrite, on manufacturing each of the batteries.

As readily understood from Table 4, the alkaline batteries using the separator papers of the embodiments are superior to the quadruple layer structure separator paper of conventional example 1 and the triple layer structure separator paper of conventional example 2, in 2Ω discharge representative of high rate discharge property and a low rate discharge of 100Ω that is index representative of the battery capacity. For example, although 2Ω discharge time is 130 minutes in the battery using the triple layer structure separator paper of conventional example 2, 2Ω discharge times lengthen and are between 139 minutes and 155 minutes in the batteries using the separator papers according to the embodiments of the present invention. The high rate discharge property is improved in each separator paper of each embodiment. Furthermore, although 100Ω discharge time is 210 hours in the battery using the triple layer structure separator paper of conventional example 2, 100Ω discharge times lengthen and are between 229 hours and 248 hours in the batteries using the separator papers according to the embodiments of the present invention. Inasmuch as each separator paper is thin in each embodiment, the electric resistance reduces and it is possible to fill much positive electrode active material and much negative electrode active material in the battery. As a result, the battery capacity increases.

When the separator paper of each conventional example is used in the single layer structure similar to each embodiment, each of 2Ω and 100Ω discharge times lengthen and the properties are improved. On the other hand, the results of intermittent discharge test reduce and are 0.3V and 0.2V in the conventional examples 1 and 2, respectively. Inasmuch as the gas tightness are low and are 0.03 minutes/100 ml and 0.01 minutes/100 ml in the separator papers of conventional examples, each of the separator papers of conventional examples is of inferior shielding. It is conceivable that the internal shortage occurs in the battery on the basis of the growth of zinc oxide dendrite. Furthermore, the results of intermittent discharge test reduce and are 0.9V and 0.7V in the conventional examples 1 and 2 which are the quadruple layer structure separator paper and the triple layer structure separator paper, respectively. It is conceivable that a light shortage occurs in the battery on the basis of the growth of zinc oxide dendrite, because of manufacturing the battery without adding the inhibiter.

As readily understood from the gas tightness, the voltages after the intermittent discharge are large values between 0.8V and 1.2V in the separator papers according to the present embodiments. The internal shortage is resistant to occurrence in each of the separator papers according to the present embodiments. In addition, the voltage after the intermittent discharge reduces to 0.8V in the embodiment 9 in comparison to the other embodiments when the separator paper of the embodiment 9 is used in the single layer structure. Inasmuch as the degree of polymerization is low in the alkali treated pulp used in the separator paper of the embodiment 9, the deterioration of separator paper proceeds during discharge in accordance with the positive electrode active material and the electrolyte and the shielding function reduces with respect to the zinc oxide dendrite. Incidentally, the voltage after the intermittent discharge is 1.2V in the battery which uses the separator papers of the embodiment 9 in condition of double layer structure. When the thickness of separator paper increases, it is possible to prevent the shortage based on the growth of zinc oxide dendrite, even if the degree of polymerization is low in the alkali treated pulp.

On the other hand, the comparison example 1 is the battery using the separator paper which is manufactured from the alkali treated pulp having only crystalline structure of cellulose 2. The average fiber length becomes short as 0.15 mm in the comparison example 1 after beating the alkali treated pulp. The pulp fibers are not sufficiently fibrillated and it takes 15 hours to carry out the beating treatment until CSF value becomes 2 ml. Inasmuch as the fibers are cut off in the comparison example 1, the average fiber length becomes short and the fine fibers flow out of the paper making net so that the gas tightness reduces to 3 minutes/100 ml, on manufacturing the separator paper. The voltage after the intermittent discharge becomes 0.5V in the battery using the separator paper of the comparison example 1 and is lower than the voltages between 0.8V and 1.2V according to the embodiments of the present invention. This means that the shielding function reduces with respect to the zinc oxide dendrite in the comparison example 1.

In addition, the embodiments 3 are examples in which the ratios of cellulose 2 are varied between 22% and 93%. The voltage after the intermittent discharge reduces to 0.8V in the embodiment 3-7 in which the ratio of cellulose 2 is 93%. The voltage after the intermittent discharge reduces to 1.0V in the embodiment 3-6 in which the ratio of cellulose 2 is 88%. It is conceivable that the light shortage occurs in each the batteries on the basis of the zinc oxide dendrite. Inasmuch as the shortage is confirmed on detecting the voltage just after manufacturing the battery in the comparison example 3, it is impossible to carry out the discharge tests. The separator paper in which the ratio of cellulose 2 is 0% is inappropriate for using as the separator paper. Furthermore, the shrinkage becomes large in the separator paper having a small ratio of cellulose 2 that is not greater than 40% such as 22%, as readily understood from the embodiment 3-1. Therefore, the battery lacks in reliability when such a separator paper is used in the battery.

The fibers are easy to be cut off on the beating treatment, in the alkali treated pulp having only crystalline structure of cellulose 2. It is impossible to obtain the separator paper having high shielding function between both electrodes of the alkaline battery, inasmuch as the average fiber length becomes short. As readily presumed from the gas tightness of separator paper, the result of intermittent discharge test reduces to 0.3V in the battery using the separator paper of the comparison example 4, in comparison to each embodiment. The shielding function of separator paper reduces with respect to the zinc oxide dendrite as well as the comparison example 1. Therefore, the beaten degree is appropriate to a range between 50 ml and 0 ml in the alkali treated pulps of the present embodiments.

The comparison example 5 is the battery using the available cellophane as the separator paper. Inasmuch as the cellophane has the large electric resistance of 38.6Ω, both of 2Ω discharge time and 100Ω discharge time become short. For example, 2Ω discharge time is 96 minutes and 100Ω discharge time is 212 hours in the battery properties. Inasmuch as the cellophane has the large electric resistance, the internal resistance increases in the battery and the high rate discharge property reduces.

As described above, the separator paper of the present invention has thinness which is thinner than the conventional separator paper. The separator paper has the sufficient shielding function which is capable of preventing the internal shortage in battery that is based on the zinc oxide dendrite. Inasmuch as the separator paper of the present invention is able to be used in the single layer structure, it is possible to reduce the internal resistance of alkaline battery. Therefore, it is possible to increase the electric capacity inasmuch as the active materials are capable of increasing in amount in the battery. Furthermore, it is unnecessary to add the inhibiter in the battery and it is possible to obtain the alkaline battery having the improved high rate discharge property.

In the inside-out type alkaline battery using the above-mentioned separator paper, it is necessary to roll the separator paper into the cylindrical shape and to seal the bottom portion of cylinder into the cup shape. The separator paper whose bottom portion is sealed into the cup shape is inserted into the cylindrical positive electrode and fixed in the cylindrical positive electrode. After pouring the alkali electrolyte, zinc gel of negative electrode is filled in the separator paper cylinder. As a result, it is possible to easily manufacture the alkaline battery.

In case of sealing the bottom portion of separator paper cylinder into the cup shape, as described above, it is possible to add a heat sealing function to the separator paper when mixing the thermoplastic fibers such as the heat treated vinylon fibers, polyamide fibers, polyolefin fibers, the synthetic pulps, the composite fibers, or the like. As a result, it is possible to easily seal the bottom portion of separator paper. Incidentally, it is possible to use the separator paper of the present invention on sealing the bottom portion of separator paper cylinder. For example, the separator paper is cut into a separator paper part whose size is greater than the diameter of separator paper cylinder. The separator paper part is shaped into a cup shaped section which is slightly greater than the separator paper cylinder. When the separator paper cylinder is engaged into the cup shaped section, it is possible to seal the bottom portion of separator paper cylinder.

On manufacturing the alkaline battery according to the present invention, the separator paper of single layer structure or the separator papers laminated into the double layer structure are interposed between the positive electrode and the negative electrode using zinc as the active material, and is impregnated in the electrolyte. In case of using two separator papers laminated into double layer structure, the same separator papers may be used. Alternatively, the separator papers whose densities or thickness are different from each other may be used in the double layer structure. Although sum thickness of the separator papers which are interposed between the positive electrode and the negative electrode becomes between 15 μm and 120 μm, the sum thickness of the separator papers preferably is between 20 μm and 80 μm.

Incidentally, overlapped portion having at least double layers occurs in the separator paper cylinder, in case of rolling the separator paper of single layer structure or the separator papers laminated into the double layer structure, in the inside-out type alkaline battery. In case of the alkaline battery according to each of the present embodiments, the overlapped portions are not included in the laminated number of separator papers or the sum thickness.

As described above in detail, according the separator paper for alkaline battery and the alkaline battery obtained by the present invention, it is possible to make the thickness of separator paper be thinness which is not realized by the prior art. Furthermore, the separator paper for alkaline battery obtained by the present invention has the shielding function which is capable of preventing the internal shortage of battery that is based on the zinc oxide dendrite. In addition, it is possible to reduce the internal resistance and to accomplish the improvement of high rate discharge property and the increase of electric capacity for alkaline battery obtained by the present invention. As a result, it is possible to widely use the separator paper of the present invention in the alkaline battery such as an alkaline manganese battery, a nickel zinc battery, a silver oxide battery, an zinc air battery, or the like which uses zinc as the negative electrode active material.

What is claimed is:

1. A separator paper for isolating a positive electrode material and a negative electrode material in an alkaline-battery, said separator paper comprising:
    individual cellulose fibers having a crystalline structure in which a crystalline structure of cellulose 1 and a crystalline structure of cellulose 2 co-exist and the ratio of said crystalline structure of cellulose 2 to said crystalline structure of cellulose 1 is from 40% to 90% and wherein said separator paper is prepared from an alkali-treated pulp beaten to a Canadian Standard Freeness value of 50 to 0 ml.

2. The separator paper of claim 1, wherein the ratio of said crystalline structure of cellulose 2 to said crystalline structure of cellulose 1 is from 50% to 85%.

3. The separator paper of claim 1, wherein said separator paper has a thickness of from 15 μm to 60 μm and a gas tightness of from about 10 min/100 ml to 800 min/100 ml.

4. The separator paper of claim 1, wherein said separator paper has a thickness of from 15 μm to 60 μm, a gas tightness of from about 10 min/100 ml to 800 min/100 ml, and a surface-area shrinkage rate of less than about 2%.

5. The separator paper of claim 1, wherein the alkali-treated pulp content is from 80% to 100% by weight in said separator paper.

6. The separator paper of claim 1, wherein the raw material pulp is treated using an aqueous solution of NaOH in a concentration of from 12% to 17% by weight.

7. The separator paper of claim 1, wherein the average fiber length of said alkali-treated pulp is from 0.2 to 0.6 mm.

8. The separator paper of claim 1, wherein the degree of polymerization is 1,000 or greater in said alkali-treated pulp.

9. The separator paper of claim 1, wherein the brightness of the alkali-treated pulp is bleached less than 60%.

10. An alkaline battery comprising:
    a positive electrode material,
    a negative electrode material, and
    said separator paper of claim 1 isolating said positive electrode material from said negative electrode material.

11. The alkaline battery of claim 10, wherein said separator paper is present in one of a single layer or a double layer.

12. The alkaline battery of claim 10 wherein said separator paper has a thickness of from 15 μm to 120 μm.

13. A separator paper for isolating a positive electrode material and a negative electrode material in an alkaline-battery, said separator paper comprising:
individual cellulose fibers having a crystalline structure in which a crystalline structure of cellulose 1 and a crystalline structure of cellulose 2 co-exist and the ratio of said crystalline structure of cellulose 2 to said crystalline structure of cellulose 1 is from 40% to 90%, wherein said alkali-treated pulp content is from 80% to 100% by weight in said separator paper and wherein said separator paper is prepared from an alkali-treated pulp beaten to a Canadian Standard Freeness value of 50 to 0 ml.

14. The separator paper of claim 13, wherein the ratio of said crystalline structure of cellulose 2 to said crystalline structure of cellulose 1 is from 50% to 85%.

15. The separator paper of claim 13, wherein said separator paper has a thickness of from 15 μm to 60 μm and a gas tightness of from about 10 min/100 ml to 800 min/100 ml.

16. The separator paper of claim 13, wherein said separator paper has a thickness of from 15 μm to 60 μm, a gas tightness of from about 10 min/100 ml to 800 min/100 ml, and a surface-area shrinkage rate of less than about 2%.

17. The separator paper of claim 13, wherein the raw material pulp is treated using an aqueous solution of NaOH in a concentration of from 12% to 17% by weight.

18. The separator paper of claim 13, wherein the average fiber length of said alkali-treated pulp is from 0.2 to 0.6 mm.

19. The separator paper of claim 13, wherein the degree of polymerization is 1,000 or greater in said alkali-treated pulp.

20. The separator paper of claim 13, wherein the brightness of the alkali-treated pulp is bleached less than 60%.

21. An alkaline battery comprising:
a positive electrode material,
a negative electrode material, and
said separator paper of claim 13 isolating said positive electrode active material from said negative electrode active material.

22. The alkaline battery of claim 21, wherein said separator paper is present in one of a single layer or a double layer.

23. The alkaline battery of claim 21, wherein said separator paper has a thickness of from 15 μm to 120 μm.

24. A separator paper for isolating a positive electrode material and a negative electrode material in an alkaline-battery, said separator paper comprising:
individual cellulose fibers having a crystalline structure in which a crystalline structure of cellulose 1 and a crystalline structure of cellulose 2 co-exist and the ratio of said crystalline structure of cellulose 2 to said crystalline structure of cellulose 1 is from 40% to 90% and wherein said separator paper is prepared from an alkali-treated pulp beaten to a Canadian Standard Freeness value of 50 to 0 ml,
wherein the crystalline structure of cellulose 1 and the crystalline structure of cellulose 2 dispersively exist in a single cellulose fiber of said individual cellulose fibers.

25. The separator paper of claim 24, wherein said alkali-treated pulp content is from 80% to 100% by weight in said separator paper.

26. An alkaline battery comprising:
a positive electrode material,
a negative electrode material, and
said separator paper of claim 24 isolating said positive electrode material from said negative electrode material.

\* \* \* \* \*